US011027864B2

United States Patent
Hyodo et al.

(10) Patent No.: US 11,027,864 B2
(45) Date of Patent: Jun. 8, 2021

(54) LAYERED FOOD PACKAGING SYSTEM, LAMINATE MAKER, AND CARRIER

(71) Applicant: KABUSHIKI KAISHA YASKAWA DENKI, Kitakyushu (JP)

(72) Inventors: Tomoya Hyodo, Kitakyushu (JP); Haruhiko Koike, Kitakyushu (JP); Teruhisa Kitagawa, Kitakyushu (JP); Koichi Kirihara, Kitakyushu (JP); Motohiro Hamazawa, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 168 days.

(21) Appl. No.: 16/118,576

(22) Filed: Aug. 31, 2018

(65) Prior Publication Data

US 2019/0071195 A1    Mar. 7, 2019

(30) Foreign Application Priority Data

Sep. 6, 2017   (JP) .............................. JP2017-170966

(51) Int. Cl.
*B65B 5/04* (2006.01)
*A21D 13/32* (2017.01)
(Continued)

(52) U.S. Cl.
CPC .............. *B65B 5/045* (2013.01); *A21D 13/10* (2017.01); *A21D 13/32* (2017.01); *B25J 9/0093* (2013.01);
(Continued)

(58) Field of Classification Search
CPC ........... B65G 57/03; B65B 5/04; B65B 5/045; B65B 5/06; B65B 5/067; B65B 25/001;
(Continued)

(56) References Cited

U.S. PATENT DOCUMENTS 4,632,254 A * 12/1986 Scopatz .................... B07C 5/28
  177/25.13
4,795,648 A *  1/1989 Capy ...................... B65D 65/02
  229/87.03
(Continued)

FOREIGN PATENT DOCUMENTS

JP         8-91323 A    4/1996
JP         3044515 U   12/1997
(Continued)

OTHER PUBLICATIONS

Office Action dated Mar. 5, 2019 in corresponding Japanese Patent Application No. 2017-170966 (with English Translation), citing document AO therein, 7 pages.
(Continued)

*Primary Examiner* — Hemant Desai
*Assistant Examiner* — Christopher Robin Kim
(74) *Attorney, Agent, or Firm* — Oblon, McClelland, Maier & Neustadt, L.L.P.

(57) ABSTRACT

A layered food packaging system including a conveyor that conveys a first layered food and a second layered food, a lamination device that laminates the first layered food onto the second layered food on the conveyor such that a layered food laminate is made, a carrier device that holds the layered food laminate and carries the layered food laminate from the conveyor, and a package device that prepares a bag for the layered food laminate carried by the carrier device and places the layered food laminate into the bag.

20 Claims, 23 Drawing Sheets

(51) Int. Cl.
*A21D 13/10* (2017.01)
*B65B 57/14* (2006.01)
*B65B 35/58* (2006.01)
*B65B 35/16* (2006.01)
*B65B 43/26* (2006.01)
*B65B 35/24* (2006.01)
*B25J 9/00* (2006.01)

(52) U.S. Cl.
CPC .............. *B65B 35/16* (2013.01); *B65B 35/24* (2013.01); *B65B 35/58* (2013.01); *B65B 43/26* (2013.01); *B65B 57/14* (2013.01)

(58) Field of Classification Search
CPC ......... B65B 25/06; B65B 25/18; B65B 35/30; B65B 35/36; B65B 35/50; B65B 35/56; B65B 35/58; B65B 57/12; B65B 57/14; B65B 35/16; B65B 43/26; B65B 35/24; B25J 9/0093; A21D 13/32; A21D 13/10
USPC .............. 426/232, 518, 410–415; 99/443 R, 99/443 C; 53/495, 498, 499, 502, 540, 53/167, 570, 255, 284.7
See application file for complete search history.

(56) References Cited

U.S. PATENT DOCUMENTS

| | | | | |
|---|---|---|---|---|
| 4,827,698 A * | 5/1989 | Banks | ................ | B07C 5/18 53/443 |
| 5,174,094 A * | 12/1992 | Powell, Jr. | ................ | B65B 1/06 53/138.7 |
| 5,347,792 A * | 9/1994 | Meli | ................ | B29C 66/83513 53/450 |
| 5,928,692 A * | 7/1999 | Mayfield | ................ | A21D 15/08 426/410 |
| 6,063,416 A * | 5/2000 | Teasdale | ................ | B65D 5/4204 229/117.27 |
| 6,093,431 A * | 7/2000 | Sullivan | ................ | A21D 15/00 426/118 |
| 6,245,368 B1 * | 6/2001 | Sullivan | ................ | A21D 15/00 426/118 |
| 6,845,860 B1 * | 1/2005 | Walker | ................ | B65G 47/53 198/433 |
| 8,409,645 B2 * | 4/2013 | Feldmeier | ................ | B65D 75/322 426/115 |
| 8,551,545 B2 * | 10/2013 | Feldmeier | ................ | B65D 81/3272 426/115 |
| 2002/0161467 A1 * | 10/2002 | Hashiguchi | ................ | G05B 23/0229 700/116 |
| 2010/0124589 A1 * | 5/2010 | Feldmeier | ................ | B65D 77/06 426/115 |
| 2010/0170201 A1 * | 7/2010 | Aquarius | ................ | B65B 35/56 53/443 |
| 2010/0303980 A1 * | 12/2010 | Grossman | ................ | A47G 21/001 426/389 |
| 2011/0059209 A1 * | 3/2011 | Khatchadourian | .. | A21C 11/006 426/232 |
| 2011/0296967 A1 * | 12/2011 | Al-Heraibi | ................ | B26D 1/30 83/454 |
| 2012/0192526 A1 * | 8/2012 | Spix | ................ | B65B 57/00 53/396 |
| 2012/0217129 A1 * | 8/2012 | Tsutsumi | ................ | B25J 9/0093 198/341.07 |
| 2013/0031876 A1 * | 2/2013 | Fritzsche | ................ | B65G 47/5104 53/492 |
| 2013/0247519 A1 * | 9/2013 | Clark | ................ | B65B 5/00 53/452 |
| 2014/0299447 A1 * | 10/2014 | Bauer | ................ | B65B 25/06 198/418 |
| 2015/0024090 A1 * | 1/2015 | Schubert | ................ | A21D 13/32 426/89 |
| 2015/0060234 A1 * | 3/2015 | Kurachi | ................ | B65G 47/38 198/370.03 |
| 2015/0183535 A1 * | 7/2015 | Vardakostas | ................ | B65B 5/045 53/459 |
| 2016/0039550 A1 * | 2/2016 | Boudreau | ................ | B65B 35/36 53/446 |
| 2016/0075459 A1 * | 3/2016 | Brandhorst | ................ | B65B 35/08 53/444 |
| 2016/0159510 A1 * | 6/2016 | Lau | ................ | B65B 35/24 53/453 |
| 2016/0176561 A1 * | 6/2016 | Findlay | ................ | B25J 15/0014 53/438 |
| 2016/0176654 A1 * | 6/2016 | Gazzola | ................ | B65G 47/244 414/751.1 |
| 2017/0203865 A1 * | 7/2017 | Kalany | ................ | B25J 9/0093 |
| 2018/0086572 A1 * | 3/2018 | Kimoto | ................ | B65G 57/03 |
| 2018/0127119 A1 * | 5/2018 | Bliemel | ................ | B65B 7/26 |
| 2019/0070820 A1 * | 3/2019 | Noda | ................ | B65B 43/32 |
| 2019/0071195 A1 * | 3/2019 | Hyodo | ................ | A21D 13/10 |
| 2019/0202069 A1 * | 7/2019 | Bando | ................ | B25J 11/0045 |
| 2019/0337164 A1 * | 11/2019 | Hirata | ................ | B65B 43/18 |
| 2019/0351563 A1 * | 11/2019 | Bando | ................ | B65G 47/907 |
| 2019/0375526 A1 * | 12/2019 | Yokota | ................ | B65B 35/18 |
| 2020/0039090 A1 * | 2/2020 | Bando | ................ | B65B 5/08 |
| 2020/0095001 A1 * | 3/2020 | Menon | ................ | B65B 5/12 |

FOREIGN PATENT DOCUMENTS

| | | | | |
|---|---|---|---|---|
| JP | 2014-162529 | * | 8/2014 | ............ B65B 35/30 |
| JP | 2014-162529 A | | 9/2014 | |
| JP | 2014-196571 A | | 10/2014 | |
| JP | 2016-144400 A | | 8/2016 | |
| JP | 2016-144400 | * | 12/2016 | ............ A23L 35/00 |

OTHER PUBLICATIONS

Japanese Office Action dated Nov. 20, 2018 in Japanese Patent Application No. 2017-170966 (with unedited computer generated English translation), citing documents AO, AP and AQ therein, 8 pages.

* cited by examiner

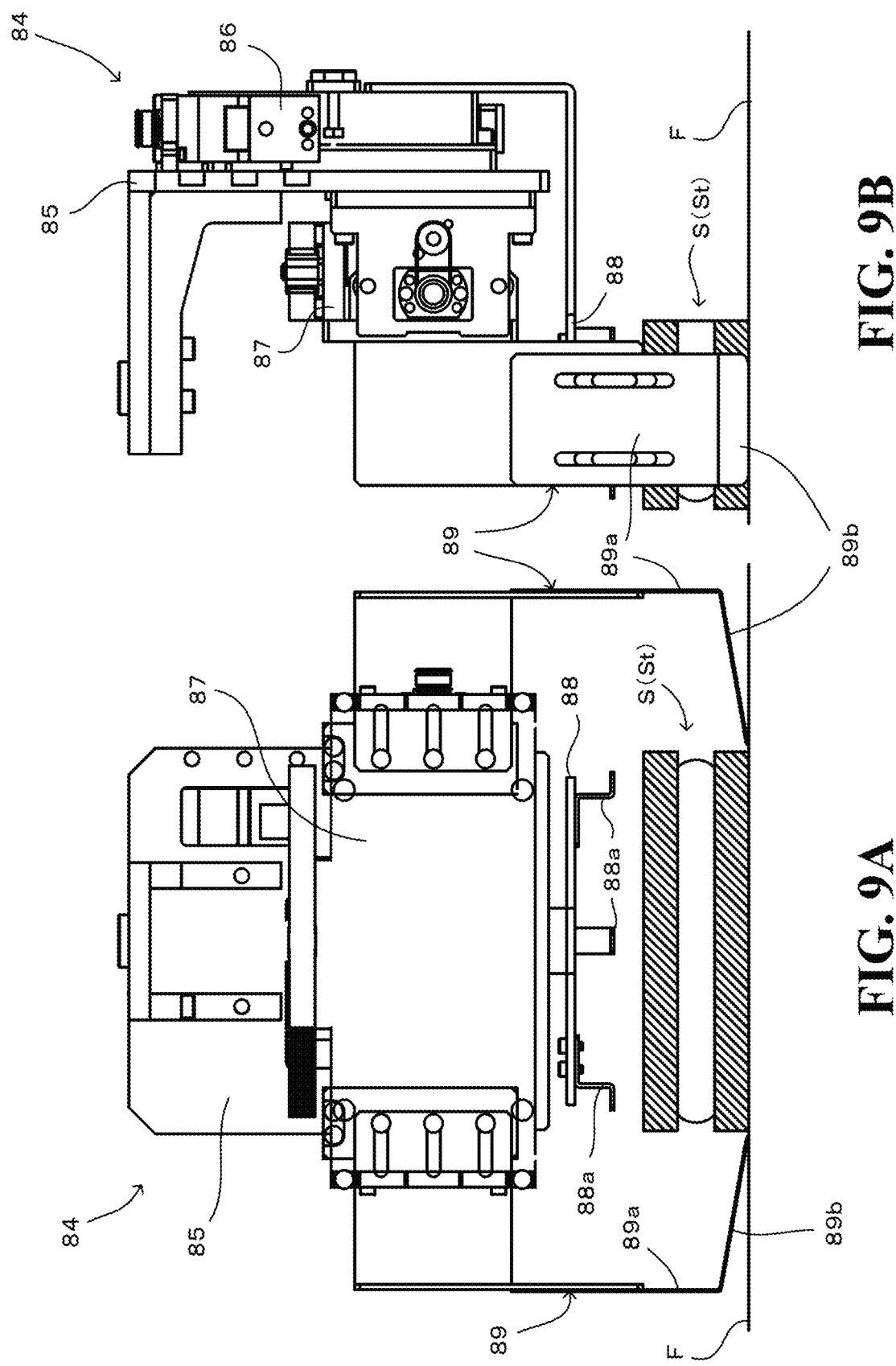

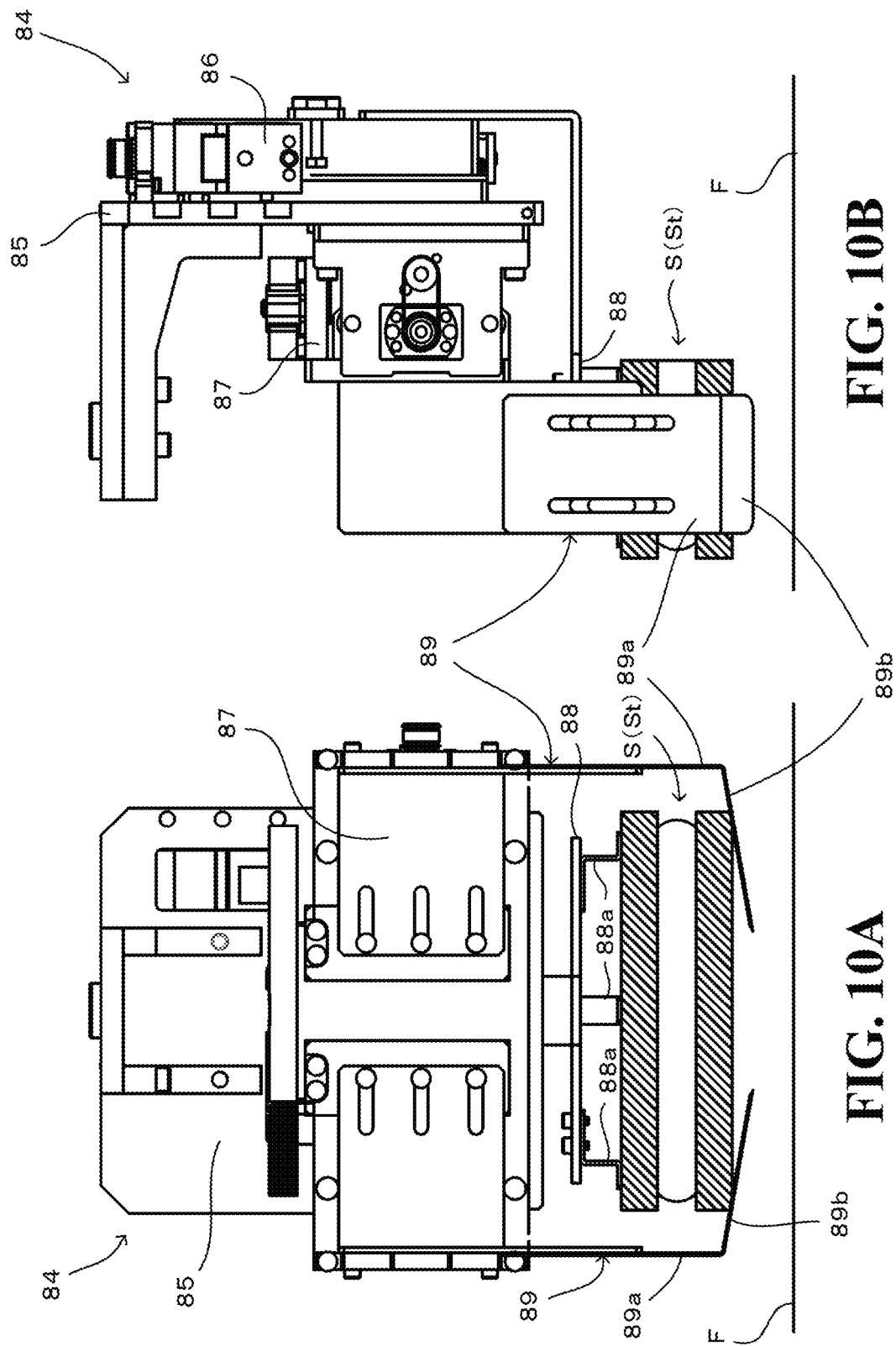

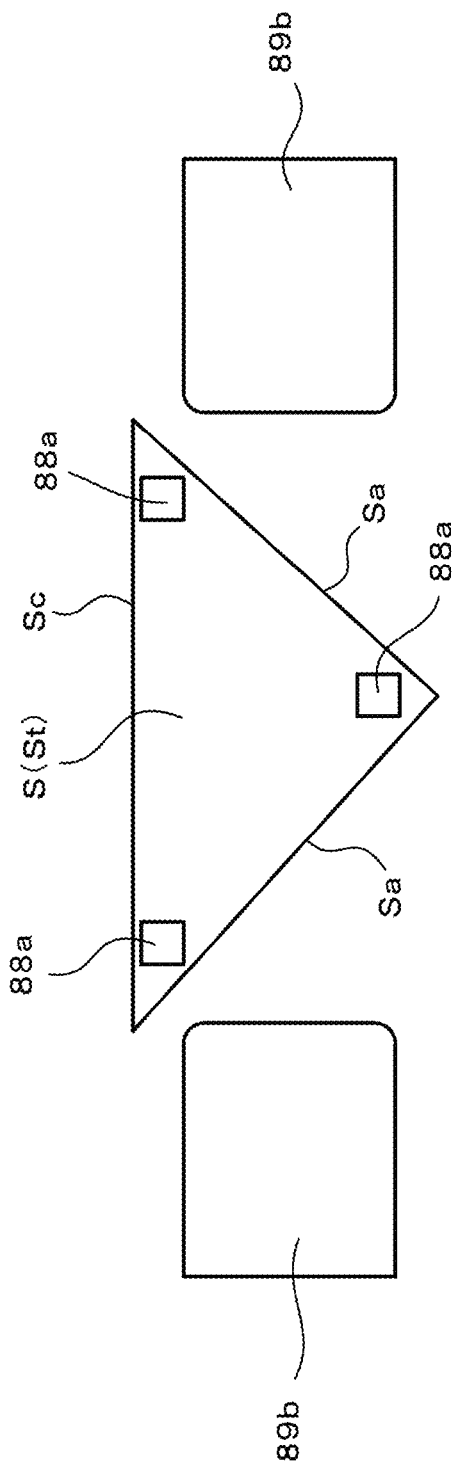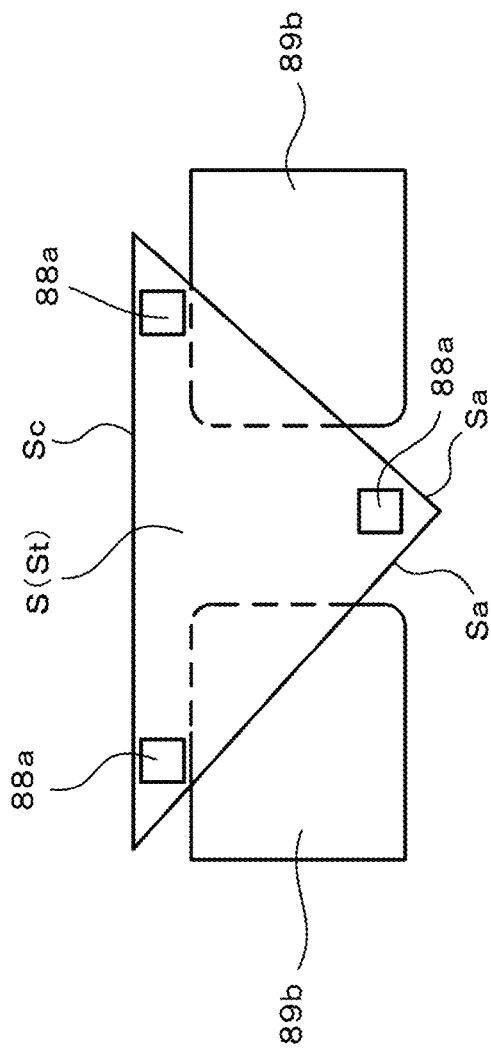
FIG. 11A
FIG. 11B

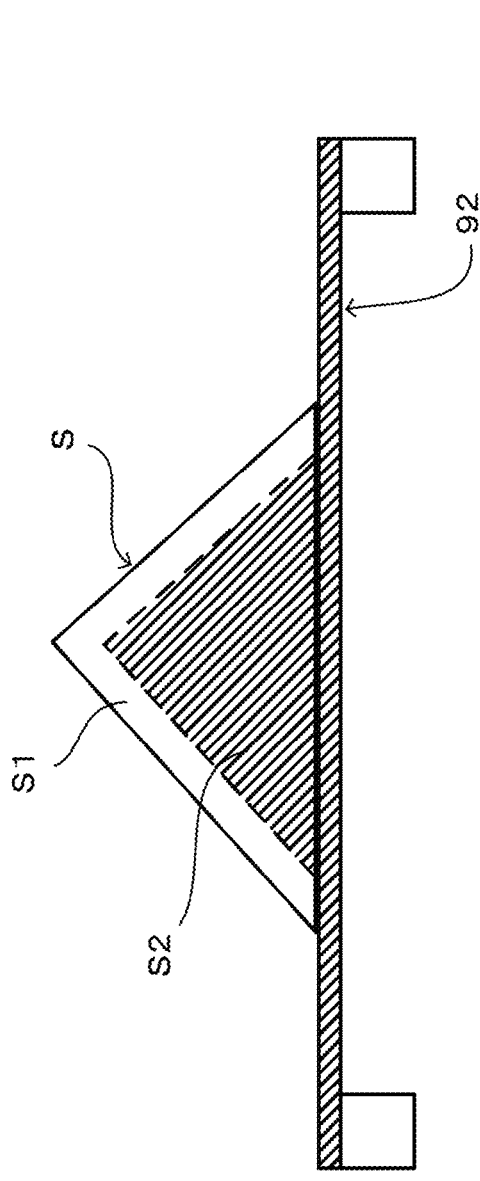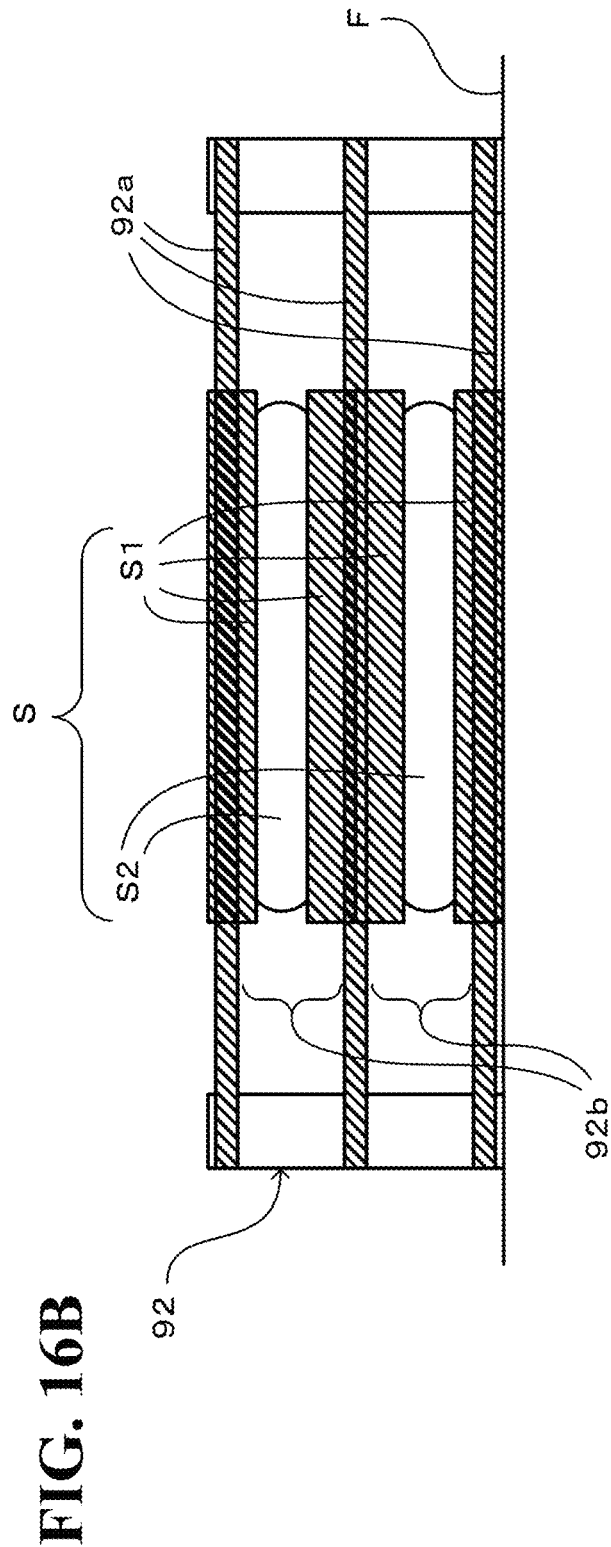
FIG. 16A
FIG. 16B

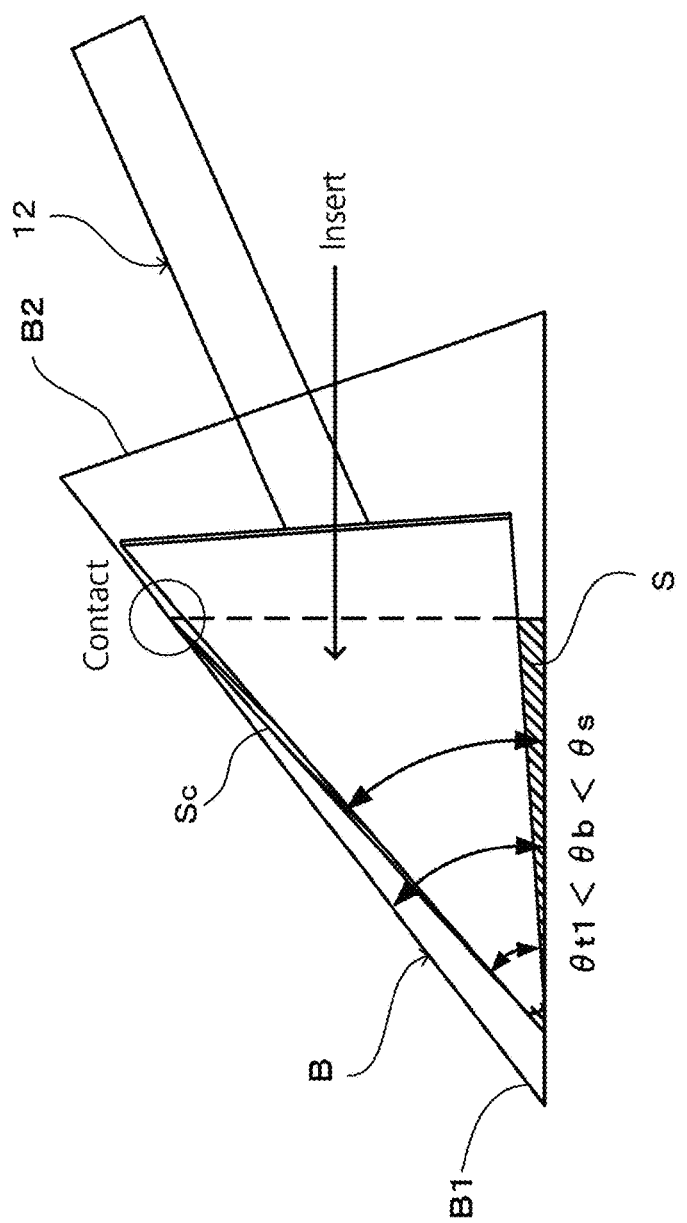
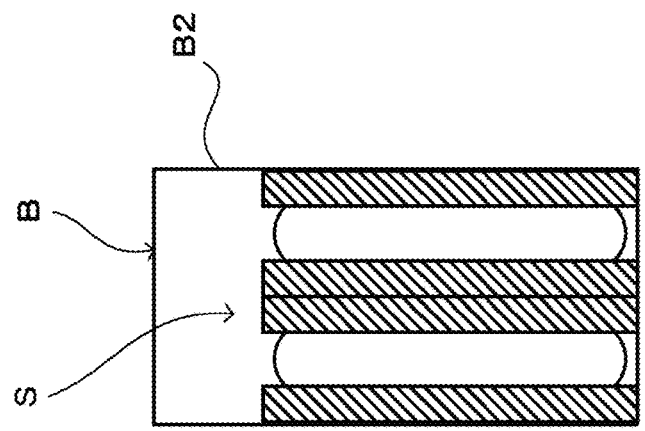
FIG. 19A
FIG. 19B

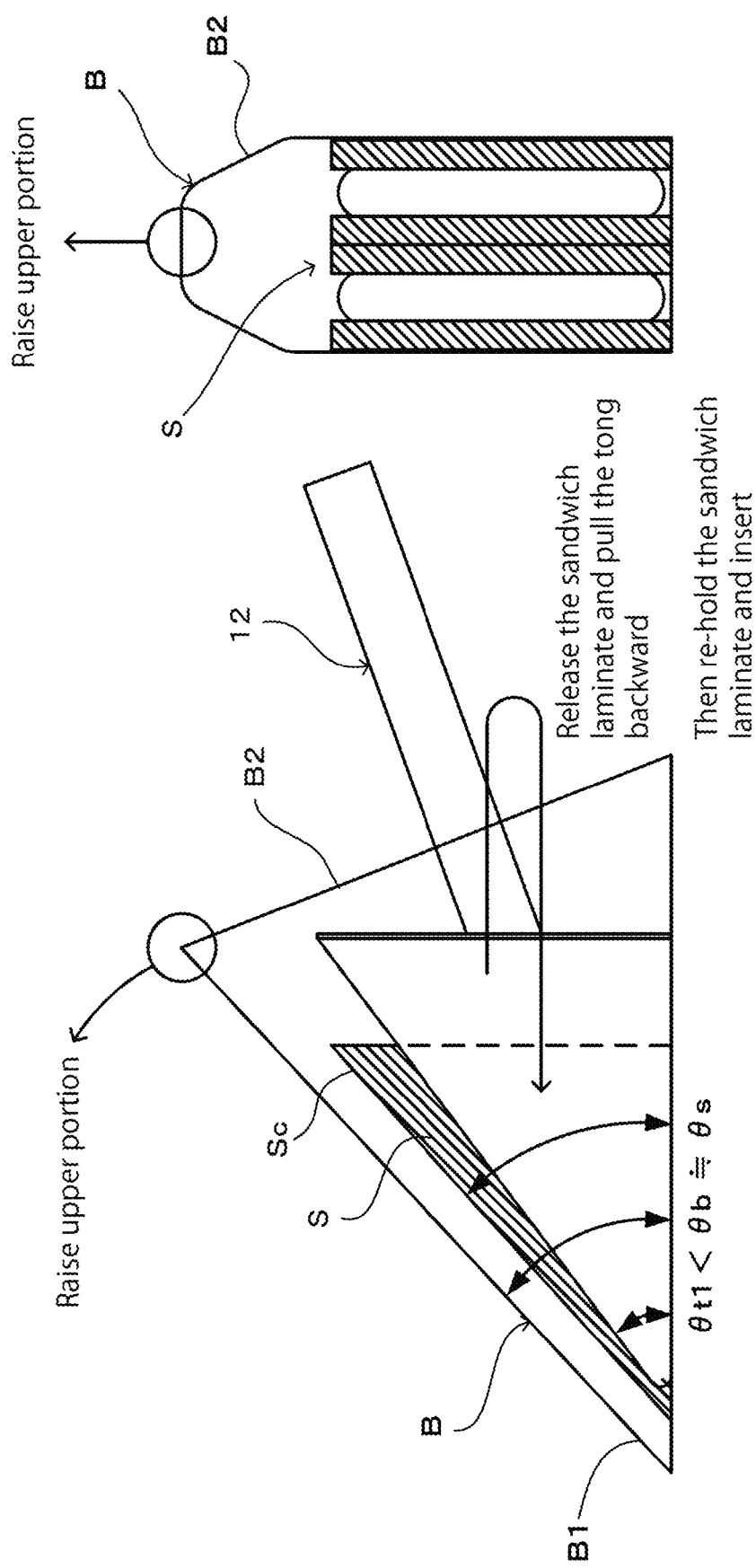

FIG. 21
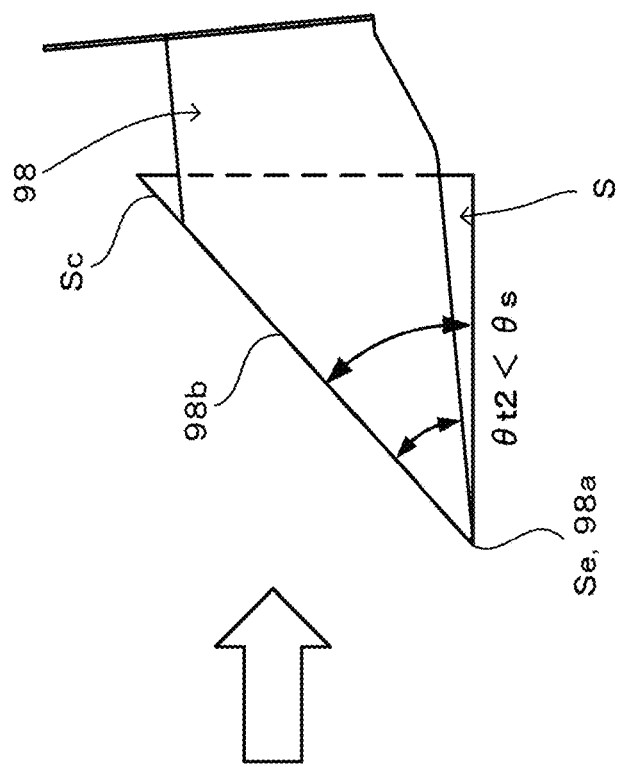
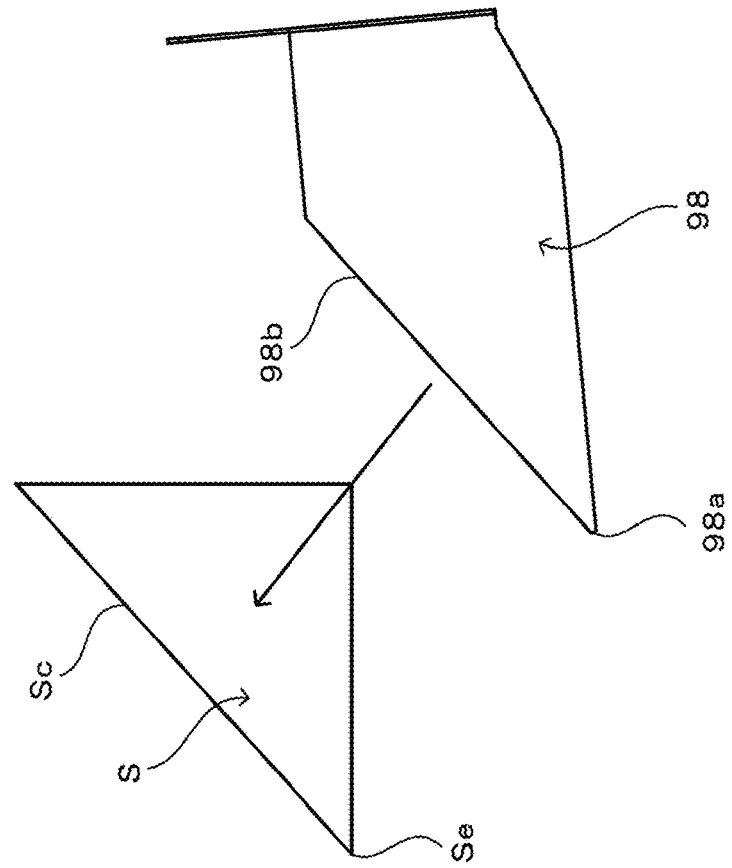

LAYERED FOOD PACKAGING SYSTEM, LAMINATE MAKER, AND CARRIER

CROSS-REFERENCE TO RELATED APPLICATIONS

The present application claims priority under 35 U.S.C. § 119 to Japanese Patent Application No. 2017-170966, filed Sep. 6, 2017. The contents of this application are incorporated herein by reference in their entirety.

BACKGROUND

Field of the Invention

The embodiments disclosed herein relate to a layered food packaging system, a laminate maker, and a carrier.

Discussion of the Background

JP 2014-198571A discloses a container filling machine that fills a container with a food product. The container filling machine includes a conveyor, a food product holder, and a filler. The conveyor conveys the food product. The food product holder holds the food product conveyed on the conveyor by contacting the upper and lower surfaces of the food product or the horizontal surfaces of the food product. The filler fills the container with the food product held in the food product holder.

SUMMARY

According to one aspect of the present invention, a layered food packaging system includes a conveyor that conveys a first layered food and a second layered food, a lamination device that laminates the first layered food onto the second layered food on the conveyor such that a layered food laminate is made, a carrier device that holds the layered food laminate and carries the layered food laminate from the conveyor, and a package device that prepares a bag for the layered food laminate carried by the carrier device and places the layered food laminate into the bag.

According to another aspect of the present invention, a lamination device of a layered food packaging system includes a first hand that raises a first layered food and places the first layered food onto a second layered food such that a layered food laminate is made. The first hand includes a pressing member that moves in a layered direction of the first layered food to press an upper surface of the first layered food, and a pair of support members that moves toward and away from each other in directions perpendicular to the layered direction and supports a lower surface of the first layered food.

According to yet another aspect of the present invention, a carrier of a layered food packaging system includes a hand including a pair of tong members that holds a layered food, a drive mechanism that drives the pair of tong members to move toward and away from each other in a layered direction of the layered food, and robot control circuitry including second torque control circuitry that performs torque control of the drive mechanism to cause a holding force of the pair of tong members to be at a predetermined holding force

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 9A is a front view of a two-level laminate making hand in open state;

FIG. 9B is a side view of the two-level laminate making hand in open state;

FIG. 10A is a front view of the two-level laminate making hand in holding state;

FIG. 10B is a side view of the two-level laminate making hand in holding state;

FIG. 11A is a top view of a sandwich in unheld state;

FIG. 11B is a top view of the sandwich in held state;

FIG. 16A is a top view of an abutting unit that is abutting the sandwiches;

FIG. 16B is a side view of the abutting unit that is abutting the sandwiches;

FIGS. 19A and 19B illustrate a first attempt to insert sandwiches into a bag in a comparative example in which packaging work is performed manually;

FIGS. 20A and 20B illustrate a second attempt to insert the sandwiches into the bag in the comparative example in which packaging work is performed manually;

FIG. 21 illustrates the shape of each of tong members of the packaging hand and illustrates how the tong members hold a sandwich laminate;

DESCRIPTION OF THE EMBODIMENTS

Figure 1:
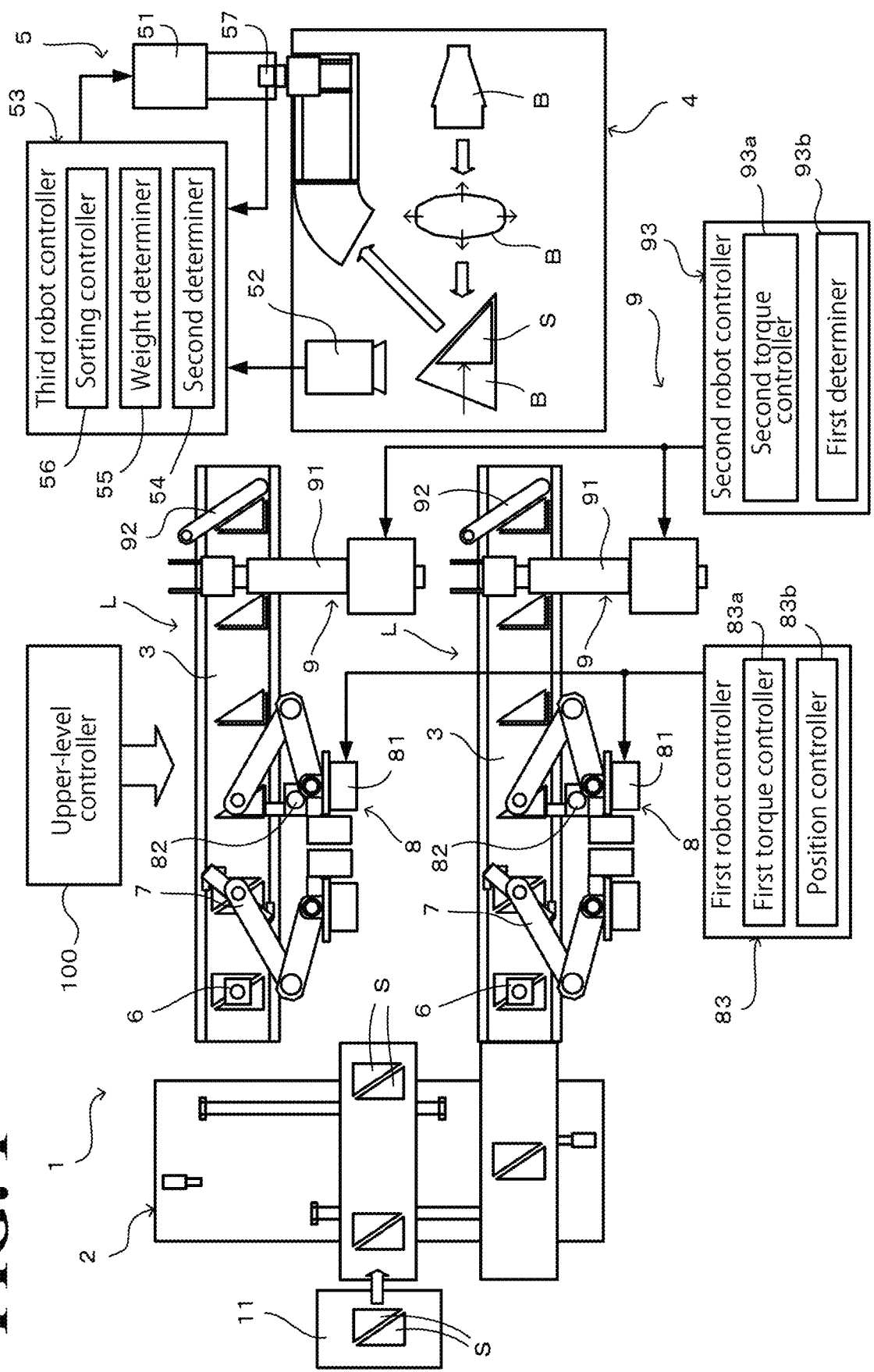
FIG. 1 illustrates an example general arrangement of a sandwich packaging system according to an embodiment.

The embodiments will now be described with reference to the accompanying drawings, wherein like reference numerals designate corresponding or identical elements throughout the various drawings.

In this embodiment, packaging of a sandwich, which is an example layered food, will be described.

1. General Arrangement of Sandwich Packaging System

FIG. 1 illustrates an example general arrangement of a sandwich packaging system 1, which is an example layered packaging system. The sandwich packaging system 1 is an automatic machine system that receives two sandwiches S, into which one sandwich has been divided, from a cutting machine (not illustrated) used in the previous process; laminates one of the two sandwiches S onto the other one of the two sandwiches S, thereby making a sandwich laminate (which is a non-limiting example of the layered food laminate recited in the appended claims); packages the sandwich laminate in a single bag B; and transfers the bag B containing the sandwich laminate to a bag enclosure (not illustrated) used in the next process.

In the sandwich packaging system 1, the conveyance direction of sandwiches S refers to the direction from the cutting machine used in the previous process toward the bag enclosure used in the next process. The sandwich packaging system 1 includes a traverser 2, conveyors 3, a packager 4, and a sorter 5, the traverser 2, the conveyors 3, the packager 4, and the sorter 5 are arranged in this order from the upstream side (left side in FIG. 1) to the downstream side (right side in FIG. 1) of the conveyance direction. Each of the conveyors 3 forms one of two conveyance lines L. The sandwich packaging system 1 also includes, on each conveyance line L, a position detection camera 6, a position corrector 7, a two-level laminate maker 8, and a bag filler 9. The position detection camera 6, the position corrector 7, the two-level laminate maker 8, and the bag filler 9 are arranged in this order from the upstream side toward the downstream side in the conveyance direction. It will be understood by those skilled in the art that the number of conveyance lines L will not be limited to two, but there may be one conveyance line L or three or more conveyance lines L. In the case of one conveyance line L, the conveyance line L may be directly connected to the cutting machine used in the previous process, instead of the conveyance line L being connected to the cutting machine through the traverser 2.

The traverser 2 (which is a non-limiting example of the distributor recited in the appended claims) receives sandwiches S transferred approximately at equal time intervals through a sandwich outlet 11 of the cutting machine (not illustrated) used in the previous process. Then, the traverser 2 distributes the sandwiches S at constant time intervals to the conveyors 3 of the two conveyance lines L. The traverser 2 will be described in more detail later by referring to FIG. 4.

Each conveyor 3 (which is a non-limiting example of the conveyor recited in the appended claims) is an endless belt conveyor system, which includes a continuous loop belt and rotatable rollers located on the inner surface of the belt. The conveyor 3 conveys sandwiches S placed on the belt by rotating to make an approximately linear trajectory. It will be understood by those skilled in the art that this conveyance operation may be performed intermittently or continuously. A non-limiting example of when the conveyance operation is performed intermittently is that it is necessary to synchronize the process steps performed in the sandwich packaging system 1. It is also possible to use any other conveyance system than the belt conveyor system.

The packager 4 (which is a non-limiting example of the packager recited in the appended claims) stores a plurality of bags B. From among the plurality of bags B, the packager 4 picks one bag B, opens the one bag B, holds the one bag B, and reshapes the one bag B. Then, the packager 4 cooperates with the bag filler 9 to fill the one bag B with sandwiches S.

The sorter 5 detects a packaging state of sandwiches S packaged at the packager 4 and detects the weight of the packaged sandwiches S. Then, based on a detection result (the detected packaging state and weight), the sorter 5 performs a sorting operation of determining whether to discharge the sandwiches S or forward the sandwiches S to the bag enclosure used in the next process. The sorter 5 includes a sorting manipulator 51, a state detection camera 52, and a third robot controller 53. The third robot controller 53 includes a second determiner 54, a weight determiner 55, and a sorting controller 56.

The sorting manipulator 51 is a robot, such as a six-axis arm robot, having a robot hand at the leading end of the arm. Using the robot hand, the sorting manipulator 51 holds packaged sandwiches S discharged from the packager 4 and moves the packaged sandwiches S either to the bag enclosure used in the next processor or a disposal site. At the same time, the state detection camera 52, which is provided in the packager 4, obtains a packaging state of the sandwiches S by picking up an image of the bottom (leading end) of the bag B. The second determiner 54 analyzes the image picked up by the state detection camera 52 to determine whether the packaging state of the sandwiches S is acceptable. The sorting manipulator 51 also includes a weight sensor 57. The weight sensor 57 measures the weight of the packaged sandwiches S. Based on a measurement result (the measured weight of the packaged sandwiches S), the weight determiner 55 determines whether the measured weight is within a reference weight range. Based on the determinations made by the second determiner 54 and the weight determiner 55, the sorting controller 56 chooses those sandwiches S whose packaging states are acceptable and whose weights are within the reference weight range. Then, the sorting controller 56 controls the sorting manipulator 51 to carry the chosen sandwiches S to the bag enclosure used in the next process and to carry unchosen sandwiches S to the disposal site, not illustrated.

The second determiner 54, the weight determiner 55, and the sorting controller 56 are implemented in the form of software processed in the third robot controller 53, which is a computer including CPU, ROM, RAM, and other elements. In another possible embodiment, the second determiner 54, the weight determiner 55, and the sorting controller 56 may be partially or entirely implemented by a tangible device or devices such as an application specific integrated circuit (ASIC), a field-programmable gate array (FPGA), and other electric circuits. For shortened tact time, the weight sensor 57 and the weight determiner 55 may detect inertia force involved when the sorting manipulator 51 raises sandwiches S, and determine the weight of the sandwiches S based on the detected inertia force.

The position detection camera 6 (which is a non-limiting example of the position detector recited in the appended claims) picks up a top-view image of sandwiches S placed on each conveyor 3. Then, based on the image, the position detection camera 6 detects an error amount by which the actual position of the sandwiches S is displaced from a predetermined reference position.

The position corrector 7 (which is a non-limiting example of the position determiner recited in the appended claims), based on the error amount of the position of the sandwiches S detected at the position detection camera 6, corrects the position of the sandwiches S to the predetermined reference position. The position corrector 7 will be described in more detail later by referring to FIG. 5.

The two-level laminate maker 8 (which is a non-limiting example of the laminate maker recited in the appended claims) works on two sandwiches S placed side by side. Specifically, the two-level laminate maker 8 laminates a first sandwich S among the two sandwiches S onto a second sandwich S among the two sandwiches S (thereby making a laminate S sandwich), as described later. The two-level laminate maker 8 includes a laminate manipulator 81, a pressing unit 82, and a first robot controller 83. The first robot controller 83 is a controller for the laminate manipulator 81 or the laminate manipulators 81. That is, as illustrated in FIG. 1, a common first robot controller 83 may collectively control the laminate manipulators 81 of the conveyance lines L. Alternatively, one first robot controller 83 may individually control one laminate manipulator 81, and another first robot controller 83 may individually control the other laminate manipulator 81. The two-level laminate maker 8 will be described in more detail later by referring to FIGS. 8 to 11.

The bag filler 9 (which is a non-limiting example of the carrier recited in the appended claims) holds the sandwich laminate S conveyed on each conveyor 3 and carries the sandwich laminate S to the packager 4. At the packager 4, where a bag B is opened, held, and reshaped, the bag filler 9 performs a packaging operation of inserting the sandwich laminate S into the bag B. The bag filler 9 includes a carrying manipulator 91, an abutting unit 92, and a second robot controller 93. The second robot controller 93 is a controller for the carrying manipulator 91 or the carrying manipulators 91. That is, as illustrated in FIG. 1, a common second robot controller 93 may collectively control the carrying manipulators 91 of the conveyance lines L. Alternatively, one second robot controller 93 may individually control one carrying manipulator 91, and another second robot controller 93 may individually control the other carrying manipulator 91. The bag filler 9 will be described in more detail later by referring to FIGS. 12 to 23.

The sandwich packaging system 1 also includes an upper-level controller 100. The upper-level controller 100 controls the entirety of the sandwich packaging system 1. The upper-level controller 100 controls controllers such as the first to third robot controllers 83, 93, and 53. The upper-level controller 100 controls other elements such as the traverser 2, the conveyors 3, and the packager 4 (or controllers for these elements). Thus, the upper-level controller 100 controls the upper-level controller 100 as a whole. It will be understood by those skilled in the art that the upper-level controller 100 may serve some or all of the functions of the first to third robot controllers 83, 93, and 53.

2. Configuration of Sandwich

Figure 2:
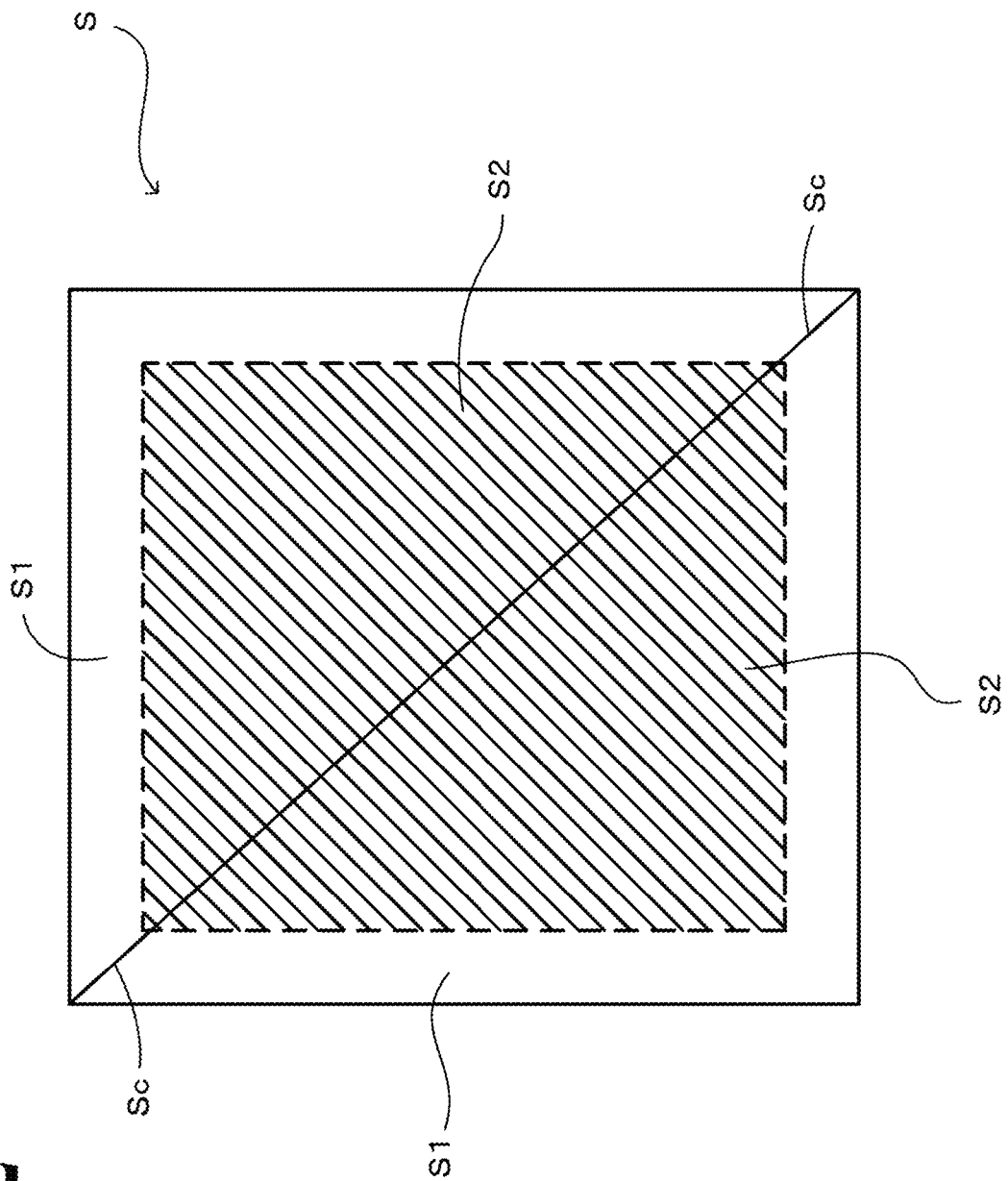
FIG. 2 is a top view of a pair of example sandwiches transferred from a cutting machine used in a previous process.
Figure 3:
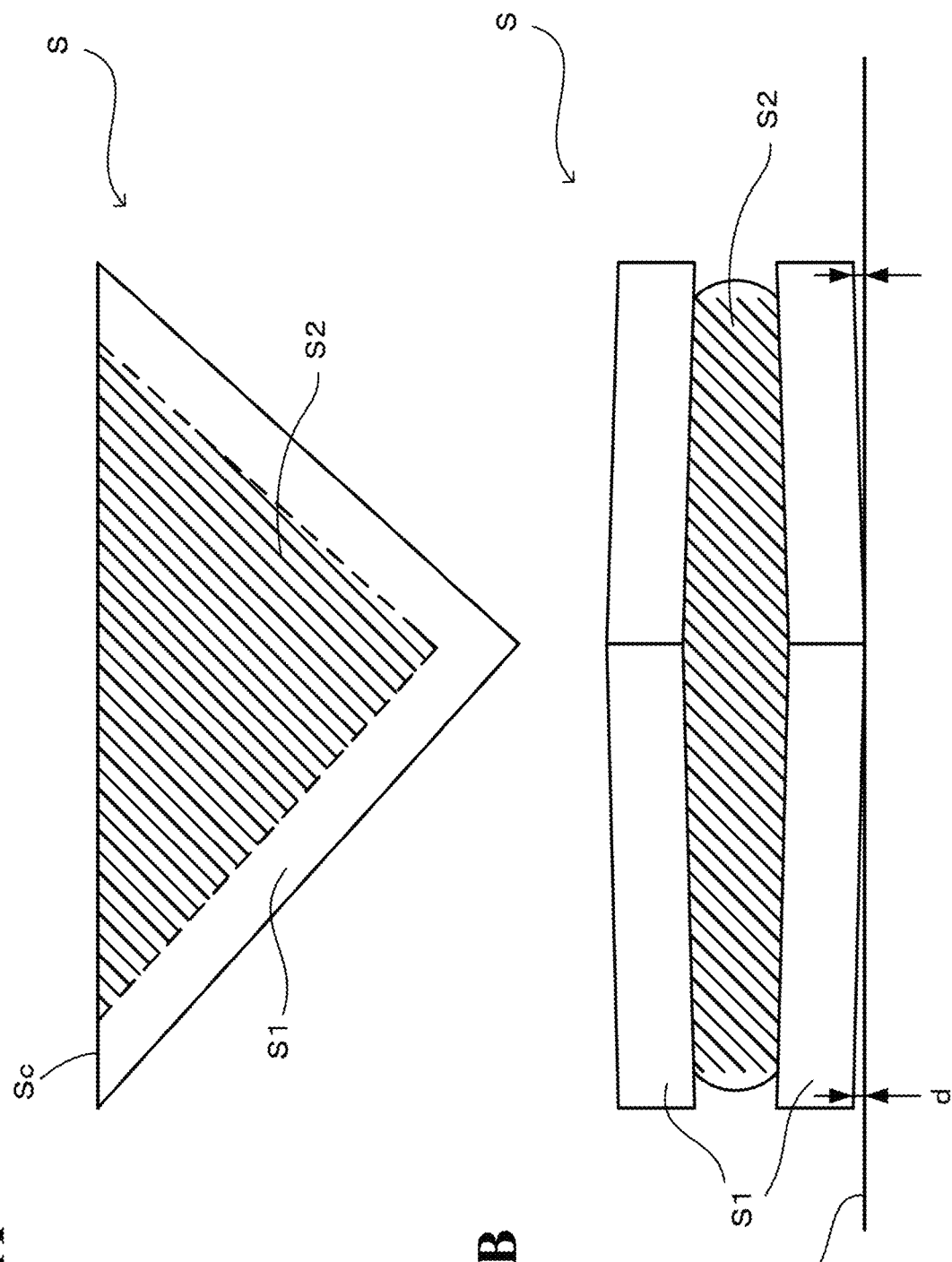
FIG. 3A is a top view of a single sandwich.
FIG. 3B is a side view of the single sandwich.

Description will be made with regard to an example configuration of sandwiches S, which are worked on by the sandwich packaging system 1. FIG. 2 is a top view of an example configuration of a pair of sandwiches S transferred from the cutting machine used in the previous process. FIG. 3A is a side view of a single sandwich S. FIG. 3B is a top view of the single sandwich S.

The pair of sandwiches S is a layered food made up of two slices of bread S1 and a food substance S2 between the slices of bread S1. Examples of the food substance S2 include, but are not limited to, meat, vegetable, a ready-to-eat food product, and seasoning. Specifically, in the example illustrated in FIG. 2, the two slices of bread S1 have the same approximately planar rectangle shapes (square shapes in the illustrated example) in top view. One of the two slices of bread S1 is superimposed on the other slice of bread S1 with top view positions of the two slices of bread S1 matching each other. The food substance S2 is located between the two slices of bread S1 and spreads over an area excluding portions around the edges of the two slices of bread S1 (see the roughly hatched area). In the previous process, a rectangular sandwich S is diagonally cut using a cutting machine into two sandwiches S each having an approximately right-angled triangle shape. The two sandwiches S are transferred on the conveyor 3 with a cut surface Sc of a first sandwich S and a cut surface Sc of a second sandwich S facing each other.

A configuration of a single sandwich S (first or second sandwich S) will be described by referring to FIG. 3A. At the cut surface Sc (which is located on the hypotenuse of the right-angled triangle), the food substance S2 is exposed. At the other two sides of the right-angled triangle (the two sides meeting at right angles), the food substance S2 is set deeper in the sandwich S than the two slices of bread S1. That is, the other two sides of the right-angled triangle are where no food substance S2 is provided. At the other two sides of the right-angled triangle, spaces d are defined between the lower slice of bread S1 and the surface, F, on which the sandwich S is placed (for example, the surface of the conveyor 3), as illustrated in FIG. 3B. A reason why the spaces d occur is that due to elasticity of the bread S1 in contrast to plasticity of the food substance S2 contacting the bread S1, residual stress occurs in the sandwich S after pressure cutting using the cutting machine. It is to be noted that approximately no spaces d occur at the cut surface Sc, where the food substance S2 is exposed.

In this embodiment, the two approximately right-angled triangle sandwiches S are transferred from the cutting machine in such a manner that the two sandwiches S are arranged side by side with their cut surfaces Sc facing each other and that the spaces d are defined between the lower slice of bread 51 and the surface F at the other two sides of each right-angled triangle. With the arrangement and the spaces d secured, the two sandwiches S are transferred to either conveyor 3 through the traverser 2 of the sandwich packaging system 1. In the sandwich packaging system 1, the two sandwiches S transferred in side-by-side arrangement are combined into a sandwich laminate S (that is, the first sandwich S is laminated onto the second sandwich S with top view positions of the two sandwiches S matching each other). Then, the sandwich laminate S is packaged in a bag B, which has a shape similar to the shape of the sandwich laminate S.

3. Configuration of Traverser

In sandwich packaging work, there is a need for cycle time reduction (takt time reduction) in each work step. Takt time reduction, however, is difficult to realize especially in the work step of making a sandwich laminate S, among the work steps of the packaging work. In light of the circumstances, the sandwich packaging system 1 distributes sandwiches S to the plurality of conveyance lines L. Specifically, the traverser 2 receives sandwiches S transferred approximately at equal time intervals from the cutting machine used in the previous process, and distributes the sandwiches S to the conveyance lines L so that the sandwiches S are parallelly subjected to the laminate making work and work steps before and after the laminate making work on the conveyance lines L. In this manner, the sandwich packaging system 1 realizes cycle time reduction (takt time reduction).

Figure 4:
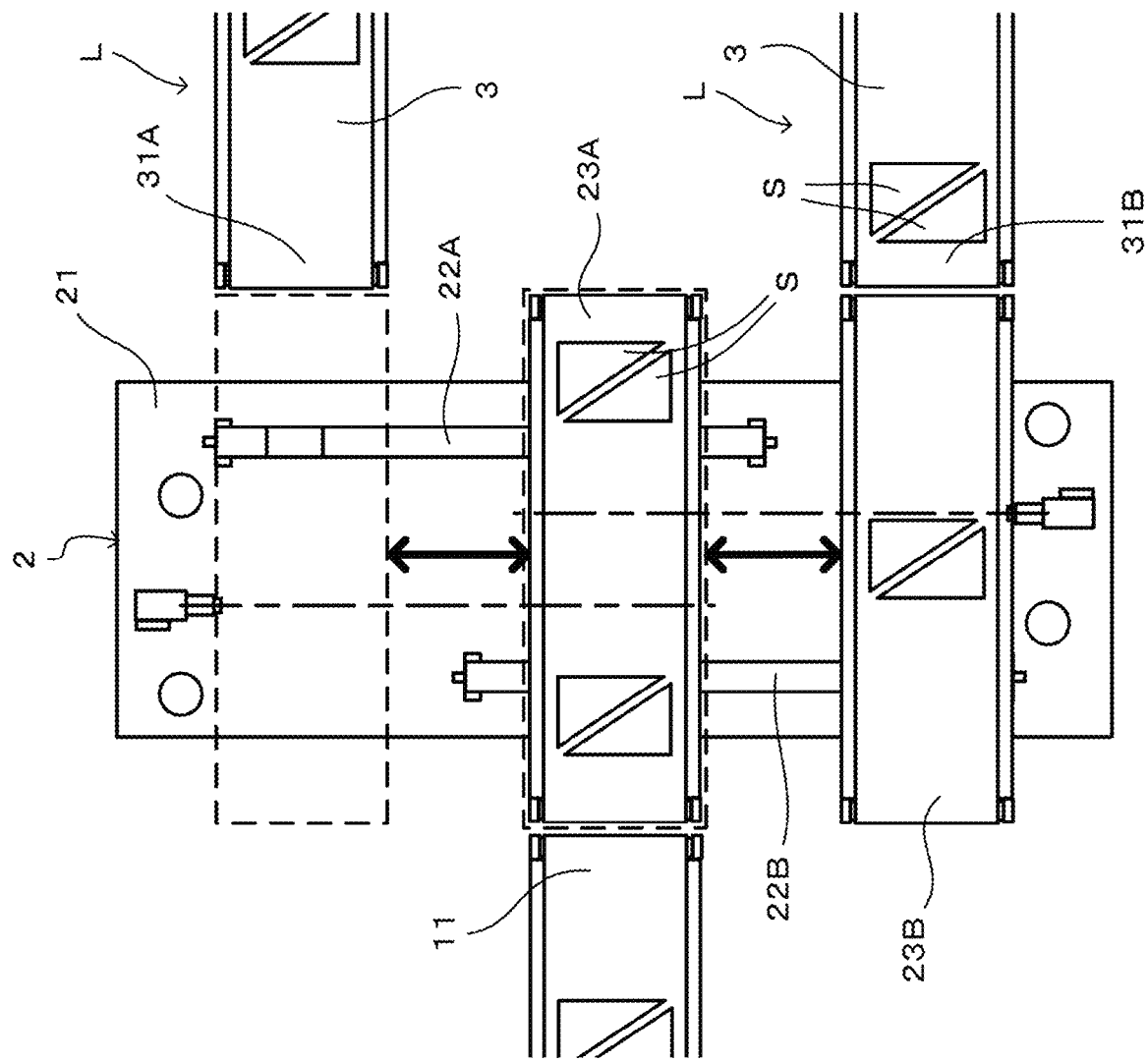
FIG. 4 is a top view of an example configuration of a traverser.

FIG. 4 is a top view of an example configuration of the traverser 2. As illustrated in FIG. 4, the traverser 2 includes a base platform 21, two drive rails 22A and 22B, and two distribution conveyors 23A and 23B. The two drive rails 22A and 22B are located on the base platform 21 in approximately parallel to each other. The distribution conveyors 23A and 23B are located on the drive rails 22A and 22B and extend in a direction orthogonal to the drive rails 22A and 22B.

At the upstream side of the traverser 2 (the left side in FIG. 4), the sandwich outlet 11 of the cutting machine used in the previous process (conveyor outlet of the cutting machine) is located. Specifically, the sandwich outlet 11 is located approximately at the center of the base platform 21 in its longitudinal direction. At the downstream side of the traverser 2 (the right side in FIG. 4), sandwich inlets 31A and 31B (inlets of the conveyors 3) of the two conveyance lines L are located. Specifically, the sandwich inlet 31A is located near one end of the base platform 21 in its longitudinal direction, and the sandwich inlet 31B is located near the other end of the base platform 21 in its longitudinal direction. Each of the two drive rails 22A and 22B is a long-size linear motion actuator. Examples of the long-size linear motion actuator include, but are not limited to, a linear motor and a combination of a rotary motor and a feed screw. The two drive rails 22A and 22B are approximately parallel to the longitudinal direction of the base platform 21. One drive rail 22A extends between the sandwich outlet 11 and the one sandwich inlet 31A, and the other drive rail 22B extends between the sandwich outlet 11 and the other the sandwich inlet 31B.

The distribution conveyor 23A is a belt conveyor having a length approximately similar to the distance between the sandwich outlet 11 and the sandwich inlet 31A in the width direction of the base platform 21 (the rightward or leftward direction in FIG. 4). The distribution conveyor 23B is a belt conveyor having a length approximately similar to the distance between the sandwich outlet 11 and the sandwich inlet 31B in the width direction of the base platform 21. The distribution conveyor 23A is movable on the drive rail 22A in the longitudinal direction of the base platform 21 (the vertical directions in FIG. 4). The distribution conveyor 23B is movable on the drive rail 22B in the longitudinal direction of the base platform 21. That is, the one distribution conveyor 23A is movable between the sandwich outlet 11 and the one sandwich inlet 31A, and the other distribution conveyor 23B is movable between the sandwich outlet 11 and the other sandwich inlet 31B.

Thus, the sandwich outlet 11 (conveyor outlet of the cutting machine) is a belt conveyor, the two distribution conveyors 23A and 23B are belt conveyors, and the two sandwich inlets 31A and 31B (inlets of the conveyors 3) are belt conveyors. This enables two of the belt conveyors to form an alignment for sandwiches S to be conveyed on. The traverser 2 receives pairs of sandwiches S transferred approximately at equal time intervals from the sandwich outlet 11. Synchronously with the receipt of pairs of sandwiches S, the two distribution conveyors 23A and 23B alternately move between the sandwich outlet 11 and the respective sandwich inlets 31. That is, movement of the distribution conveyor 23A between the sandwich outlet 11 and the sandwich inlet 31A and movement of the distribution conveyor 23B between the sandwich outlet 11 and the sandwich inlet 31B alternate with each other. This configuration enables the traverser 2 to receive pairs of sandwiches S transferred approximately at equal time intervals from the single sandwich outlet 11 and to distribute, approximately at equal spatial intervals, the pairs of sandwiches S alternately to the two conveyance lines L.

4. Configuration of Position Corrector

The sandwich laminate making work on each conveyance line L includes a holding operation of holding a pair of sandwiches S using the laminate manipulator 81, as described later. In light of the holding operation, it is preferable that the position and orientation of a pair of sandwiches S on each conveyor 3 be as close as possible to an intended position and an intended orientation. As described above, however, the supply of sandwiches S to each conveyance line L is preceded by cutting of the sandwiches S at the cutting machine and transfer of the sandwiches S between belt conveyors (specifically, the sandwiches S are transferred from the sandwich outlet 11 to the distribution conveyors 23A and 23B, and from the distribution conveyors 23A and 23B to the sandwich inlets 31A and 31B). Due to these preceding steps, there may be an error between the actual position (X axis direction and/or Y axis direction) of sandwiches S and a predetermined reference position, and there may be an error between the actual orientation (angle of θ about the Z axis) of sandwiches S and a predetermined reference orientation. In light of the circumstances, in the sandwich packaging system 1, the position detection camera 6 is provided on each conveyance line L at the upstream side of the two-level laminate maker 8 in the conveyance direction. The position detection camera 6 detects the error amount of the position of the sandwiches S. Then, based on the detected error amount, the position corrector 7 corrects the actual position of the sandwiches S to the predetermined reference position.

Figure 5:
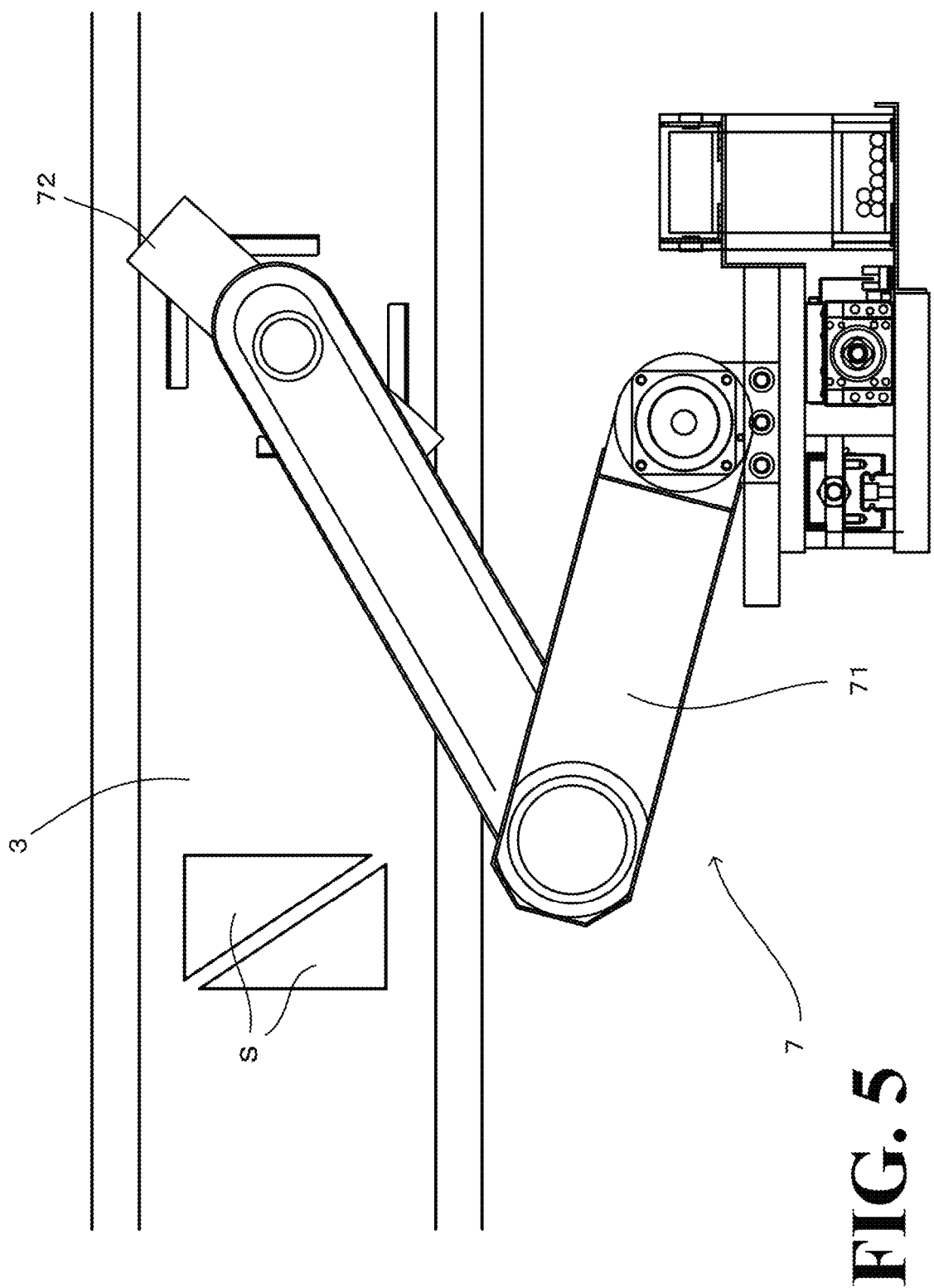
FIG. 5 is a top view of an example configuration of a position corrector.
Figure 6:
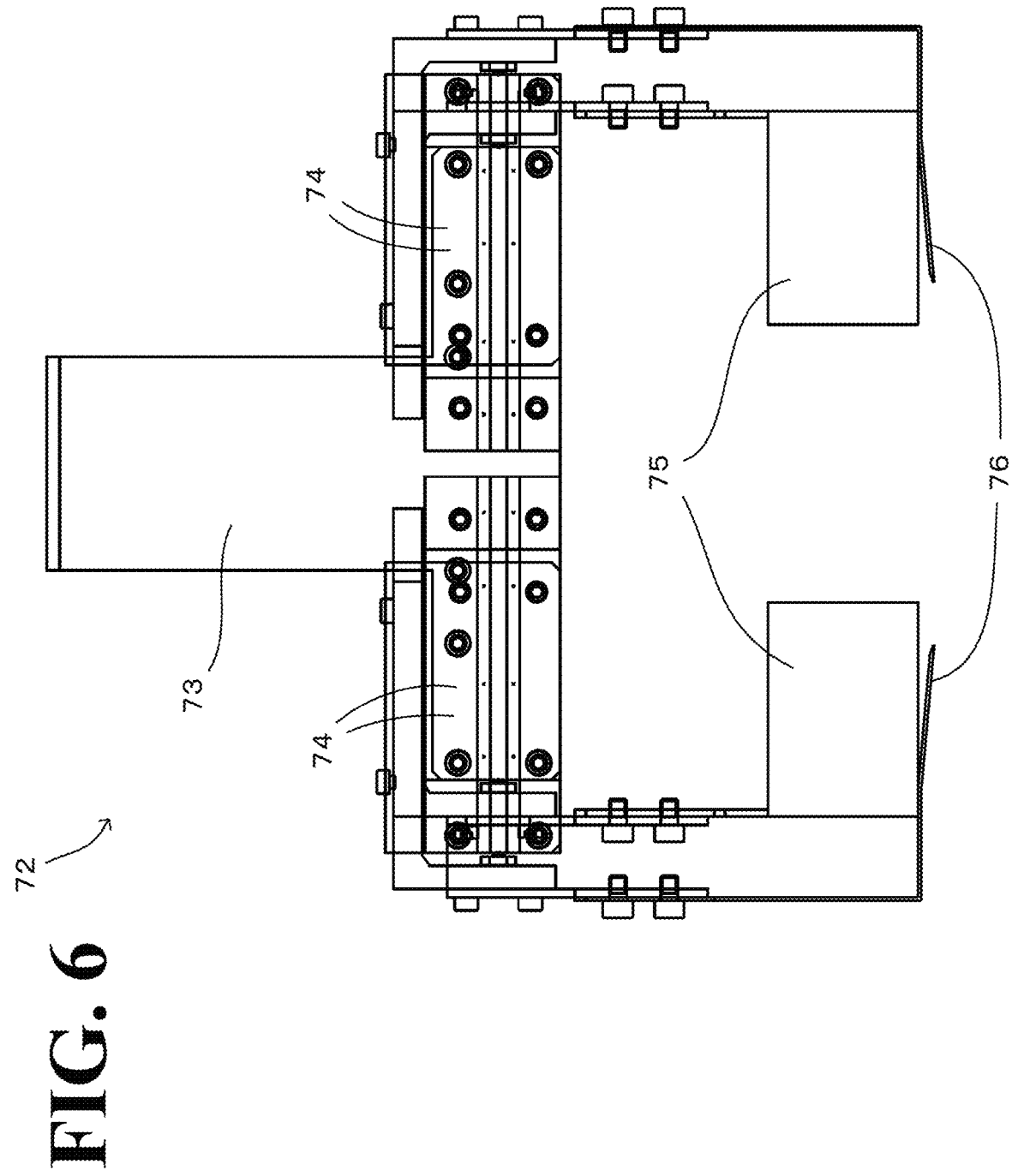
FIG. 6 is a front view of a correction hand.

FIG. 5 is a top view of an example configuration of the position corrector 7. FIG. 6 is a front view of a correction hand. FIGS. 7A to 7D are top views of the correction hand in a correction step of correcting the position of a pair of sandwiches S. As illustrated in FIG. 5, the position corrector 7 includes a correction manipulator 71 and a correction hand 72. The correction manipulator 71 is located at one side of the conveyor 3. The correction hand 72 is mounted on the leading arm end of the correction manipulator 71.

A non-limiting example of the correction manipulator 71 is a SCARA robot. On the conveyor 3, there is a movable range for the correction manipulator 71 to make horizontal movement, upward-downward movement, and rotation of the correction hand 72, which is at the leading arm end of the correction manipulator 71. It will be understood by those skilled in the art that the correction manipulator 71 may be other than a SCARA robot. Other examples include a vertical multi-articular robot.

As illustrated in FIGS. 6 and 7A to 7D, the correction hand 72 includes a hand base 73, four air cylinders 74, a pair of angle members 75, and a pair of spatula members 76. The hand base 73 is mounted on the leading arm end of the correction manipulator 71. The four air cylinders 74 include two angle-member air cylinders 74 and two spatula-member air cylinders 74. One angle-member air cylinder 74 and one spatula-member air cylinder 74 are located at one side portion of the hand base 73 (in the rightward or leftward direction in FIG. 6). The other angle-member air cylinder 74 and the other spatula-member air cylinder 74 are located at another side portion of the hand base 73. One angle member 75 is fixed to a movable portion of the one angle-member air cylinder 74, and the other angle member 75 is fixed to a movable portion of the other angle-member air cylinder 74. One spatula member 76 is fixed to a movable portion of the one spatula-member air cylinder 74, and the other spatula member 76 is fixed to a movable portion of the other spatula-member air cylinder 74.

The one angle-member air cylinder 74 and the one spatula-member air cylinder 74 form a first combination, and the other angle-member air cylinder 74 and the other spatula-member air cylinder 74 form a second combination. The movable portions of the first combination are expandable and contractible in a first horizontal direction. The movable portions of the second combination are expandable and contractible in a second horizontal direction opposite to the first horizontal direction.

Each of the angle members 75 is made up of two linear portions connected to each other at right angles. The one angle member 75 and the other angle member 75 are arranged with their opening sides (interior angle sides) facing each other. With this arrangement, the one angle member 75 is fixed to the movable portion of the one angle-member air cylinder 74 of the first combination, and the other angle member 75 is fixed to the movable portion of the other angle-member air cylinder 74 of the second combination. The one angle-member air cylinder 74 and the other angle-member air cylinder 74 cooperate with each other to expand and contract, causing the one angle member 75 and the other angle member 75 to move toward and away from each other in top view.

Each of the one spatula member 76 and the other spatula member 76 is a metal thin plate having rigidity throughout the metal thin plate. The leading end of the metal thin plate is bent at an acute angle relative to the vertical direction (downward direction). The acute angle is slightly smaller than the right angle. The one spatula member 76 and the other spatula member 76 are arranged with their lower ends facing each other. With this arrangement, the one spatula member 76 is fixed to the movable portion of the one spatula-member air cylinder 74 of the first combination, and the other spatula member 76 is fixed to the movable portion of the other spatula-member air cylinder 74 of the second combination. The one spatula-member air cylinder 74 and the other spatula-member air cylinder 74 cooperate with each other to expand and contract, causing the one spatula member 76 and the other spatula member 76 to move toward and away from each other in top view.

As illustrated in FIGS. 7A to 7D, the one angle member 75 and the one spatula member 76 are movable in the same directions in top view, and the other angle member 75 and the other spatula member 76 are movable in the same directions in top view. The one spatula member 76 is movable farther than the one angle member 75 (farther away from the hand base 73), and the other spatula member 76 is movable farther than the other angle member 75.

When a pair of sandwiches S on the conveyor 3 are conveyed to and out of the position corrector 7, the correction hand 72 moves upward to a position above the pair of sandwiches S. When the position corrector 7 performs positioning of the pair of sandwiches S, the pair of angle members 75 move away from each other to make a gap greater than the size of the pair of sandwiches S. With the pair of angle members 75 securing the gap, the correction manipulator 71 horizontally moves the pair of angle members 75 to a position over the pair of sandwiches S, and then lowers the pair of angle members 75 to near the pair of sandwiches S (see FIG. 7A). In this respect, the position detection camera 6, which is located at the upstream side of the position corrector 7, has already detected the error amount of the position (X axis direction and Y axis direction) of the pair of sandwiches S and/or the error amount of the orientation (angle of θ about the Z axis) of the pair of sandwiches S. Based on either or both of the error amounts, the correction manipulator 71 moves the pair of angle members 75 toward each other to adjust the gap between the pair of angle members 75 (see FIG. 7B).

It is to be noted, however, that there is a friction to be considered between the surface F and the bread S1 of the pair of sandwiches S. Due to the friction, the pair of sandwiches S may be deformed if positioning of the pair of sandwiches S is based solely on the movement of the pair of angle members 75 toward each other. In view of the circumstances, when the pair of angle members 75 move toward each other, the pair of spatula members 76 move toward each other at the same time to insert the leading ends of the pair of spatula members 76 into the spaces d (see FIG. 3) between the surface F and the pair of sandwiches S. In this respect, the pair of spatula members 76 secure a suitable angle of attack between the surface F and the lower surface of the leading end of each spatula member 76, and secure a suitable angle of relief between the upper surface of the leading end of each spatula member 76 and the corresponding sandwich S. This enables the pair of spatula members 76 to smoothly enter the spaces between the surface F and the pair of sandwiches S without damaging the bread S1 of the pair of sandwiches S (that is, the pair of spatula members 76 serve as spatulas). Thus, the pair of angle members 75 horizontally move toward each other while at the same time the pair of spatula members 76 horizontally move toward each other. This minimizes the friction between the surface F and the pair of sandwiches S, ensuring that the position of the pair of sandwiches S is smoothly corrected to the predetermined reference position.

Figure 7:
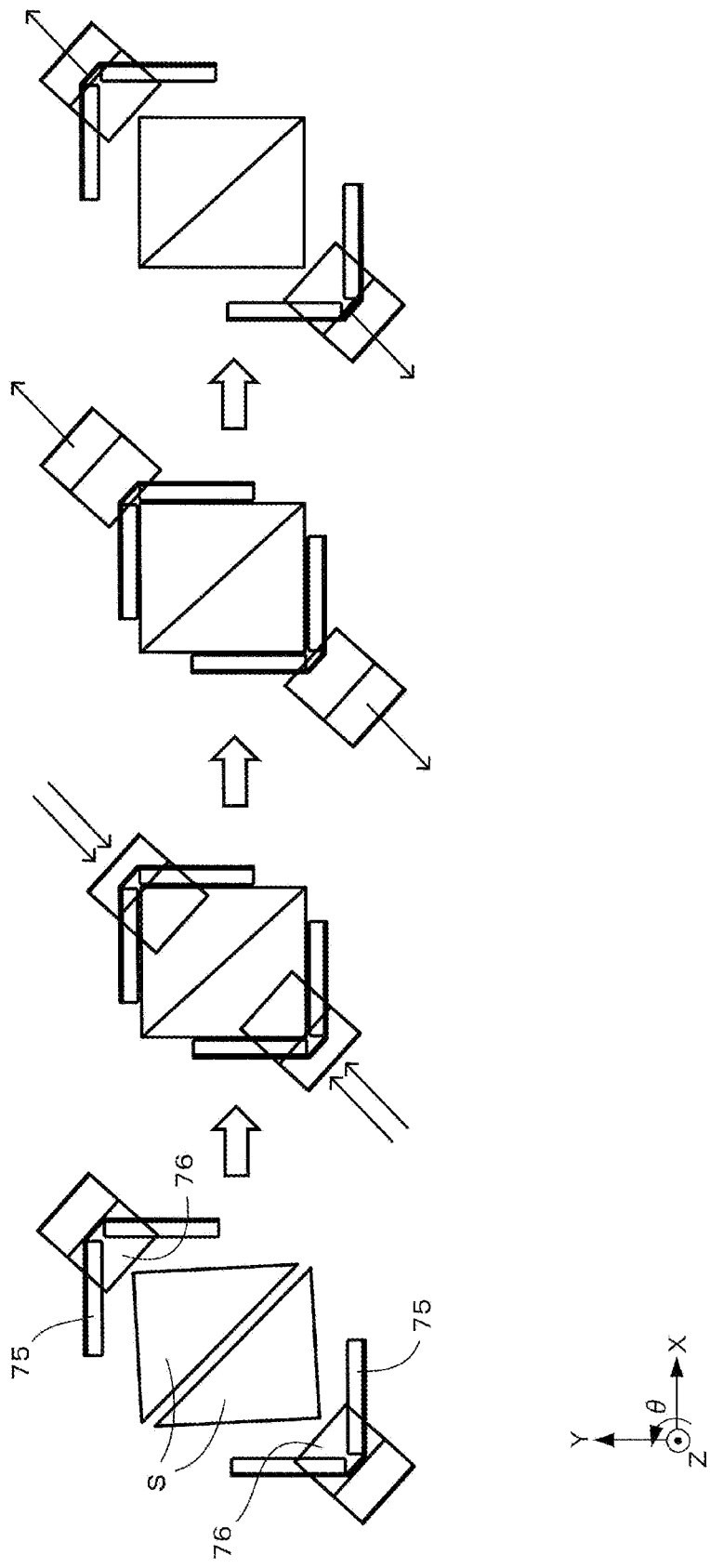
FIGS. 7A to 7D are top views of the correction hand in a correction step of correcting the position of a pair of sandwiches.

When the correction hand 72 releases the pair of sandwiches S, the pair of spatula members 76 move away from each other to pull the leading ends of the pair of spatula members 76 out of the top view areas of the pair of sandwiches S (see FIG. 7C). Then, the pair of angle members 75 move away from each other to be detached from the pair of sandwiches S (see FIG. 7D). This enables the correction hand 72 to move away from the pair of sandwiches S while keeping the pair of sandwiches S at the predetermined reference position and without deforming the pair of sandwiches S. Then, the correction manipulator 71 moves the correction hand 72 upward above the pair of sandwiches S, enabling the pair of sandwiches S to be conveyed farther on the conveyor 3.

5. Configuration of Two-Level Laminate Maker

In this embodiment, a combination of two sandwiches S is transferred to the sandwich packaging system 1 from the cutting machine used in the previous process with the cut surfaces Sc of the two sandwiches S facing each other, as described above. The combination of two sandwiches S is subjected to a preliminary step before the packaging step. The preliminary step includes laminating a first sandwich S among the two sandwiches S onto a second sandwich S among the two sandwiches S in the layered direction with top view positions of the first sandwich S and the second sandwich S matching each other. Specifically, the two-level laminate maker 8 holds and raises the first sandwich S (the upper right sandwich S of the leftmost combination illustrated in FIG. 8); turns the first sandwich S by 180 degrees (°); positions the first sandwich S over the second sandwich S (the lower left sandwich S of the leftmost combination illustrated in FIG. 8) with top view positions of the first sandwich S and the second sandwich S matching each other; and places the first sandwich S onto the second sandwich S.

It is to be noted, however, that sandwiches are flexible and easily deformable; in particular, the bread defining the exterior of a sandwich is subject to damage, even though the bread has some elasticity. Also, since the food substance S2 is exposed on the cut surface Sc of the sandwich S, if too much pressure is applied on the sandwich S in the layered direction, the food substance S2 may be forced to bulge beyond the cut surface Sc. Under the circumstances, if a typical robot hand is used to hold, move, and turn a sandwich in short takt time, the sandwich may deteriorate in quality. In light of the circumstances, in this embodiment, a two-level laminate making hand 84 is provided on the laminate manipulator 81 of the two-level laminate maker 8. The two-level laminate making hand 84 holds a sandwich S in a manner suitable for the structure of the sandwich S. Employing the two-level laminate making hand ensures that the sandwich S is held and handled in shorter takt time without deterioration of the sandwich S in quality.

Figure 8:
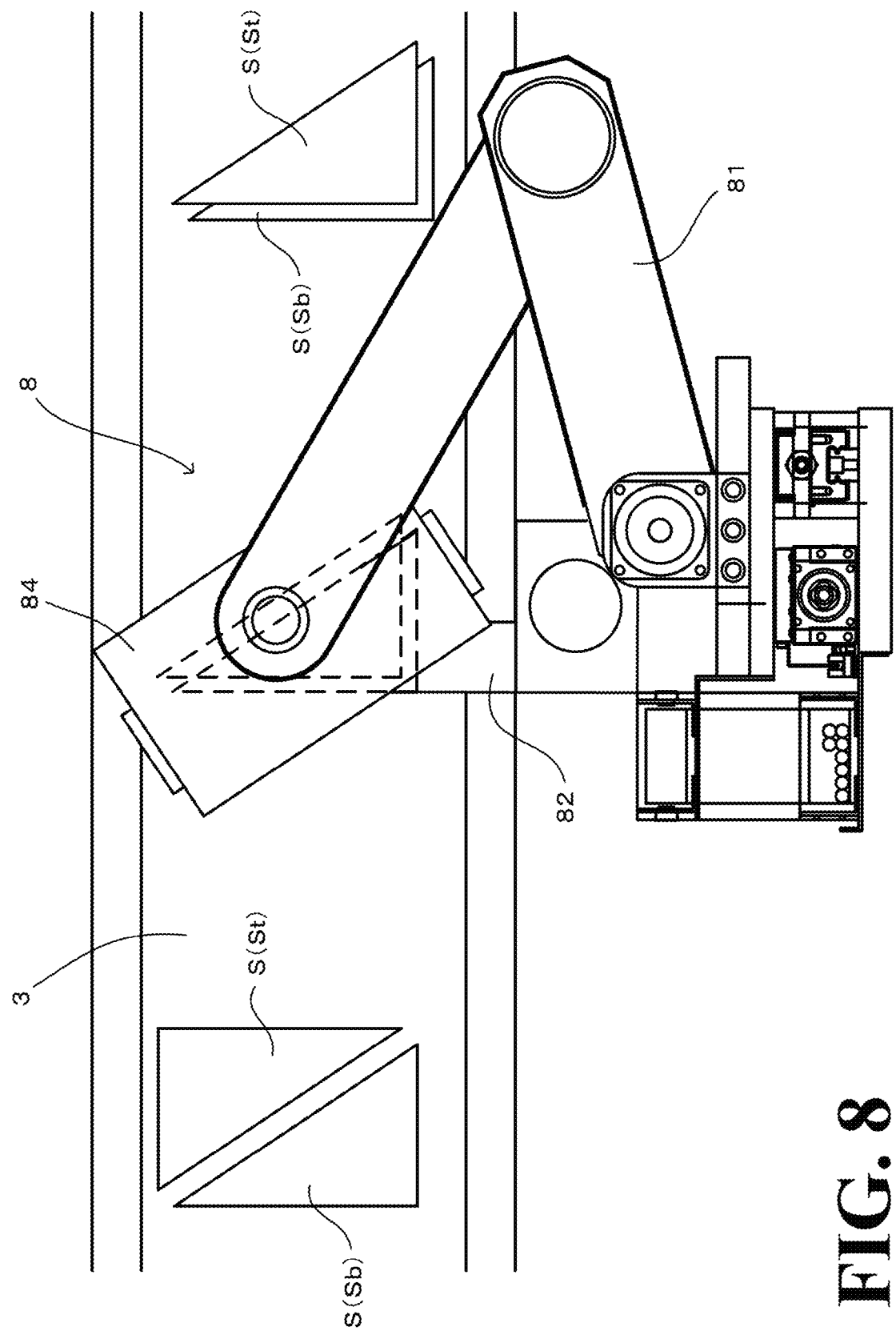
FIG. 8 is a top view of an example configuration of a two-level laminate maker.

FIG. 8 is a top view of an example configuration of the two-level laminate maker 8. FIG. 9A is a front view of the two-level laminate making hand 84 in open state. FIG. 9B is a side view of the two-level laminate making hand 84 in open state. FIG. 10A is a front view of the two-level laminate making hand 84 in holding state. FIG. 10B is a side view of the two-level laminate making hand 84 in holding state. FIG. 11A is a top view of a sandwich S in unheld state. FIG. 11B is a top view of the sandwich S in held state.

As illustrated in FIG. 8, the two-level laminate maker 8 includes the laminate manipulator 81, the two-level laminate making hand 84, the pressing unit 82, and the first robot controller 83. The laminate manipulator 81 is located at one side of the conveyor 3. The two-level laminate making hand 84 is mounted on the leading arm end of the laminate manipulator 81. The pressing unit 82 is located near the laminate manipulator 81. The first robot controller 83 is not illustrated in FIG. 8 (see FIG. 1).

A non-limiting example of the laminate manipulator 81 is a SCARA robot. On the conveyor 3, there is a movable range for the laminate manipulator 81 to make horizontal movement, upward-downward movement, and rotation of the two-level laminate making hand 84, which is at the leading arm end of the laminate manipulator 81. The two-level laminate making hand 84 and the laminate manipulator 81 controlled by the first robot controller 83. It will be understood by those skilled in the art that the laminate manipulator 81 may be other than a SCARA robot. Other examples include a vertical multi-articular robot.

The pressing unit 82 operates simultaneously with the laminate manipulator 81. Specifically, the pressing unit 82 uses a pressing plate (not illustrated) to perform a pressing operation of pressing the upper surface of a laminate base sandwich S (which is a non-limiting example of the second layered food recited in the appended claims and which will be occasionally referred to as "sandwich Sb"). The pressing unit 82 starts the pressing operation of pressing the sandwich Sb before the two-level laminate making hand 84 lifts a laminate top sandwich S (which is a non-limiting example of the first layered food recited in the appended claims and which will be occasionally referred to as "sandwich St"). After the two-level laminate making hand 84 has placed the sandwich St onto the sandwich Sb, the pressing unit 82 ends the pressing operation of pressing the sandwich Sb.

As illustrated in FIGS. 9A, 9B, 10A, and 10B, the two-level laminate making hand 84 (which is a non-limiting example of the first hand recited in the appended claims) includes a hand base 85, a lifting drive mechanism 86, an open-close drive mechanism 87, a pressing member 88, and a pair of support members 89. The hand base 85 is mounted on the leading arm end of the laminate manipulator 81. The lifting drive mechanism 86 is located on one side surface of the hand base 85. The open-close drive mechanism 87 is located on another side surface of the hand base 85. The pressing member 88 is fixed to a movable portion of the lifting drive mechanism 86. One support member 89 is fixed to one of two movable portions of the open-close drive mechanism 87. The other support member 89 is fixed to the other one of the two movable portions of the open-close drive mechanism 87.

The lifting drive mechanism 86 (which is a non-limiting example of the first drive mechanism recited in the appended claims) includes a motor, a pinion, and a rack (which are not illustrated). With this configuration, the lifting drive mechanism 86 moves the pressing member 88 upward and downward in the layered direction of the sandwich St. The pressing member 88 is a planar member with three contact portions 88a located on the lower surface of the planar member. The pressing member 88 is driven by the lifting drive mechanism 86 to move upward and downward while maintaining a posture approximately parallel to the sandwich St. The three contact portions 88a, in top view, are located at positions respectively corresponding to corner portions of the sandwich St (two acute-angle portions and one right-angle portion). When the pressing member 88 moves downward, the lower end surfaces of the contact portions 88a come into contact with the corner portions of the sandwich St from above the corner portions (see FIG. 11). This ensures that the contact portions 88a presses only those portions of the bread S1 where there is no food substance S2 under the bread S1. That is, the contact portions 88a avoid pressing portions the bread S1 where there is the food substance S2 under the bread S1.

The open-close drive mechanism 87 (which is a non-limiting example of the second drive mechanism recited in the appended claims) includes a motor, a pinion, and a rack (which are not illustrated). With this configuration, the open-close drive mechanism 87 moves the pair of support members 89 toward and away from each other in directions perpendicular to the layered direction of the sandwich St. Each of the pair of support members 89 is made of a metal material having rigidity throughout the metal material. The pair of support members 89 face each other in the open-close direction (the rightward or leftward direction in FIG. 9A) in which the pair of support members 89 open and close. Each of the pair of support members 89 includes a first extending portion 89a and a second extending portion 89b. The first extending portion 89a has a planar shape fixed to a movable portion of the open-close drive mechanism 87 and extends in the layered direction of the sandwich St (the vertical direction in FIGS. 9A and 9B). The second extending portion 89b has a planar shape extending from the lower end of the first extending portion 89a in a direction in which the angle between the first extending portion 89a and the second extending portion 89b is an obtuse angle slightly greater than the right angle. The pressing member 88 moves upward and downward in the space defined by a pair of first extending portions 89a.

As illustrated in FIGS. 9A and 11A, when the pair of support members 89 are in open state, the leading ends of a pair of second extending portions 89b are spaced apart from each other, leaving a gap wide enough to keep the pair of second extending portions 89b out of contact with the sandwich St. This enables the two-level laminate making hand 84 to move upward and downward without contacting the sandwich St, when the pair of support members 89 are in open state. As illustrated in FIG. 9A, when the laminate manipulator 81 has moved the two-level laminate making hand 84 downward to lowest position, the leading ends of the pair of second extending portions 89b are in contact with the surface F.

When the open-close drive mechanism 87 moves the pair of support members 89 toward each other with the two-level laminate making hand 84 at the lowest position, the leading ends of the pair of second extending portions 89b enter the spaces between the surface F and the sandwich St (see the spaces d illustrated in FIG. 3B), as illustrated in FIGS. 10A and 11B. In this respect, the pair of second extending portions 89b secure a suitable angle of attack between the surface F and the lower surface of each second extending portion 89b, and secure a suitable angle of relief between the upper surface of each second extending portion 89b and the sandwich St. This enables the pair of second extending portions 89b to smoothly enter the spaces between the surface F and the sandwich St without damaging the bread S1 (that is, the pair of second extending portions 89b serve as spatulas).

Simultaneously with the movement of the pair of second extending portions 89b toward each other, the lifting drive mechanism 86 moves the pressing member 88 downward, bringing the three contact portions 88a into contact with the corner portions of the sandwich St from above the corner portions, as illustrated in FIGS. 10A and 11B. Specifically, as illustrated in FIG. 11B, the pair of second extending portions 89b enter the spaces under the lower surface of the sandwich St from center portions of two side surfaces Sa of the sandwich St, which are different from the cut surface Sc of the sandwich St (two side portions defining the right angle in top view), and slide under the lower surface of the sandwich St while avoiding overlapping with the three corner portions of the sandwich St that are in contact with the three contact portions 88a.

With the configuration described hereinbefore, the two-level laminate making hand 84 is capable of holding the laminate top sandwich St in shorter takt time without damaging the laminate top sandwich St. When the two-level laminate making hand 84 is in this holding state, the pair of second extending portions 89b are supporting the sandwich St from below the sandwich St, and the three contact portions 88a are pressing the corner portions of the sandwich St from above the sandwich St. This enables the pair of second extending portions 89b and the three contact portions 88a to hold the sandwich St between the pair of second extending portions 89b and the three contact portions 88a in the layered direction while avoiding holding the region of the sandwich St where the food substance S2 is provided between the two slices of bread S1. As a result, the pair of second extending portions 89b and the three contact portions 88a are able to hold the sandwich St stably while preventing the food substance S2 from bulging beyond the cut surface Sc of the sandwich St.

In order to further stabilize the holding of the sandwich St by the two-level laminate making hand 84, the first robot controller 83 uses a first torque controller 83a (see FIG. 1) to perform torque control (pressure control) of the motor of the lifting drive mechanism 86 to make the pressing force of the pressing member 88 a predetermined pressing force. Also, the first robot controller 83 uses a position controller 83b (see FIG. 1) to perform position control of the motor of the open-close drive mechanism 87 to make the pair of second extending portions 89b enter the spaces under the lower surface of the sandwich St by a predetermined distance.

Then, the first robot controller 83 performs: the operation of raising the two-level laminate making hand 84 that is holding the laminate top sandwich St and of turning the laminate top sandwich St by 180°; the operation of moving the laminate top sandwich St to make top view positions of the laminate top sandwich St and the laminate base sandwich Sb match each other; the operation of placing the laminate top sandwich St onto the laminate base sandwich Sb; and the operation of stopping holding the laminate top sandwich St. This ensures smooth and accurate work of making the two sandwiches St and Sd into a two-level laminate.

The first torque controller 83a and the position controller 83b are implemented in the form of software processed in the first robot controller 83, which is a computer including CPU, ROM, RAM, and other elements. In another possible embodiment, the first torque controller 83a and the position controller 83b may be partially or entirely implemented by a tangible device or devices such as an ASIC, an FPGA, and other electric circuits.

6. Configuration of Bag Filler

A bag B is used to package sandwiches S. A non-limiting example of the bag B is a transparent film. The bag B has a closed side and an open side. The closed side has an acute angle and constitutes the bottom of the bag B. The open side has an opening through which sandwiches S are inserted into the bag B. Sandwiches S are preferably contained in the bag B leaving as minimal empty space as possible in the bag B. One purpose of securing minimal empty space is to avoid deformation of packaged sandwiches S during handling and transportation. Another purpose of securing minimal empty space is to make the food substance S2 more visually recognizable and more visually attractive as a product when the packaged sandwiches S are put on store shelves. Also, if sandwiches S are loosely contained in the bag B leaving a lot of empty space in the bag B, the bag enclosure used in the next process may be affected in performing bag enclosing work.

In light of the circumstances, in this embodiment, the packaging hand mounted on the carrying manipulator 91 of the bag filler 9 is adapted for the shape of sandwiches S and the shape of the bag B, and is therefore more suitable for packaging. This makes the packaging work of sandwiches S neater and performed in shorter takt time.

Figure 12:
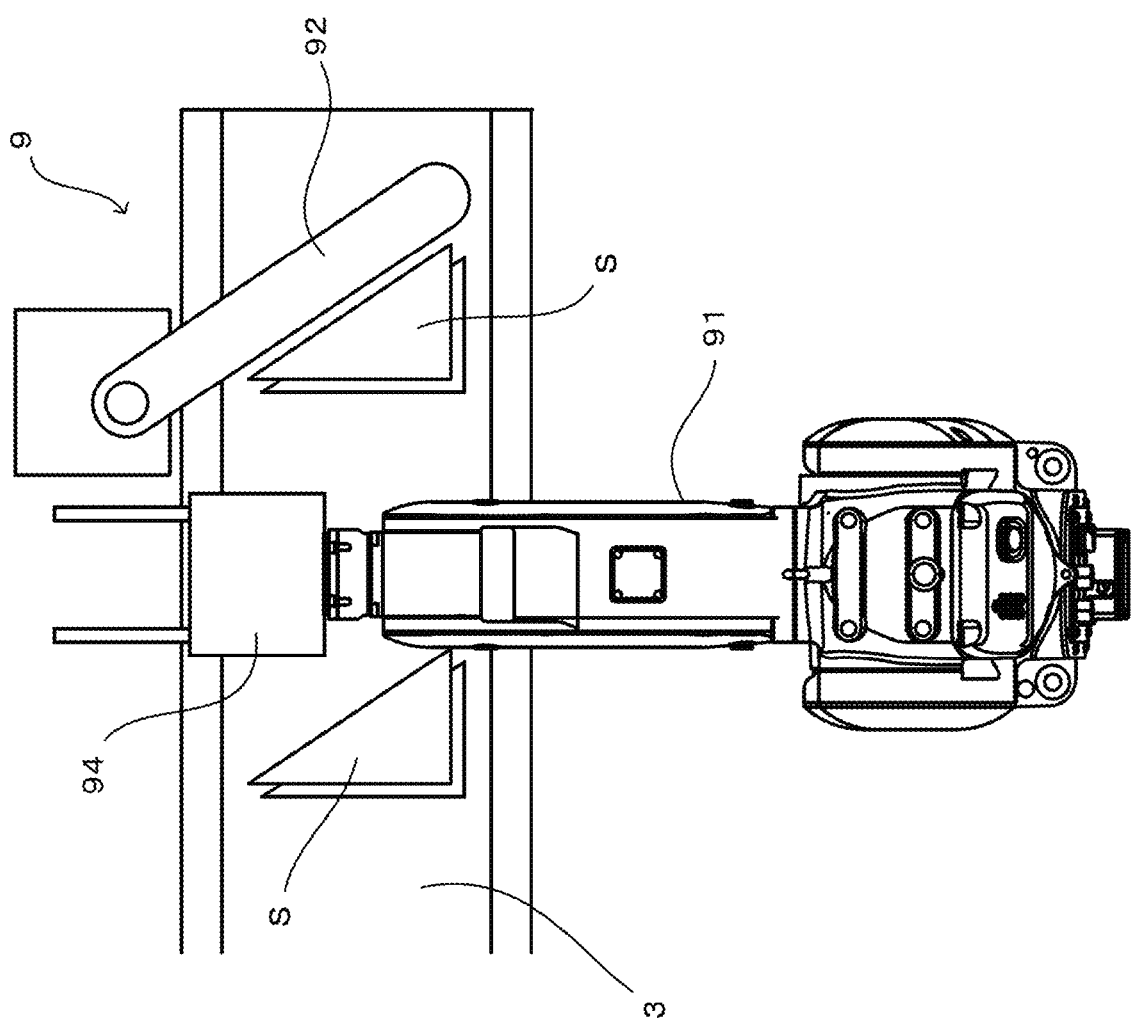
FIG. 12 is a top view of an example configuration of a bag filler.
Figure 13B:
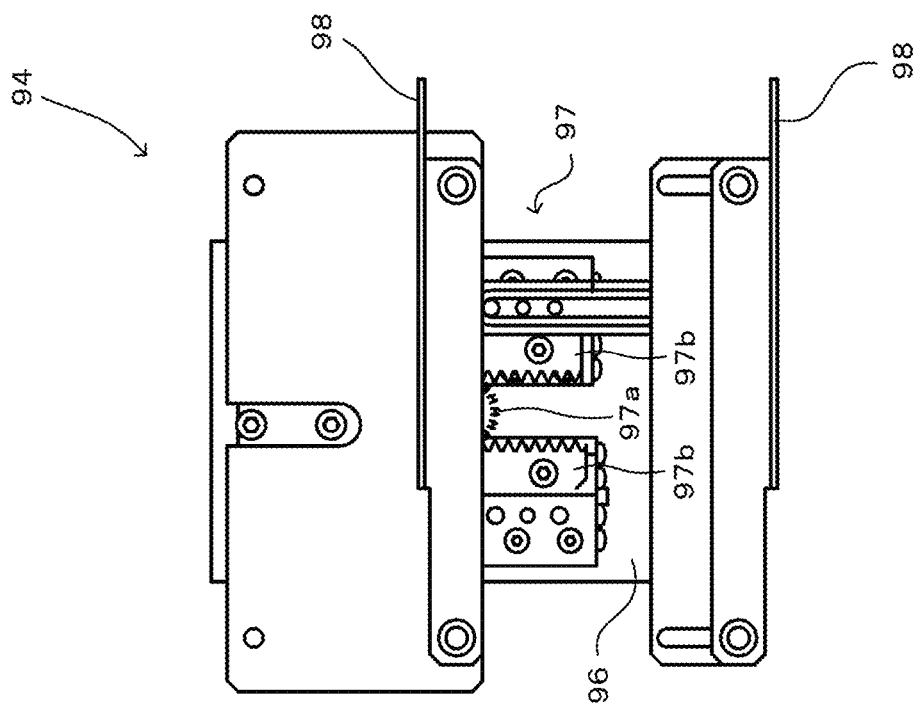
FIG. 13B is a front view of the two-side openable packaging hand in holding state.
Figure 13A:
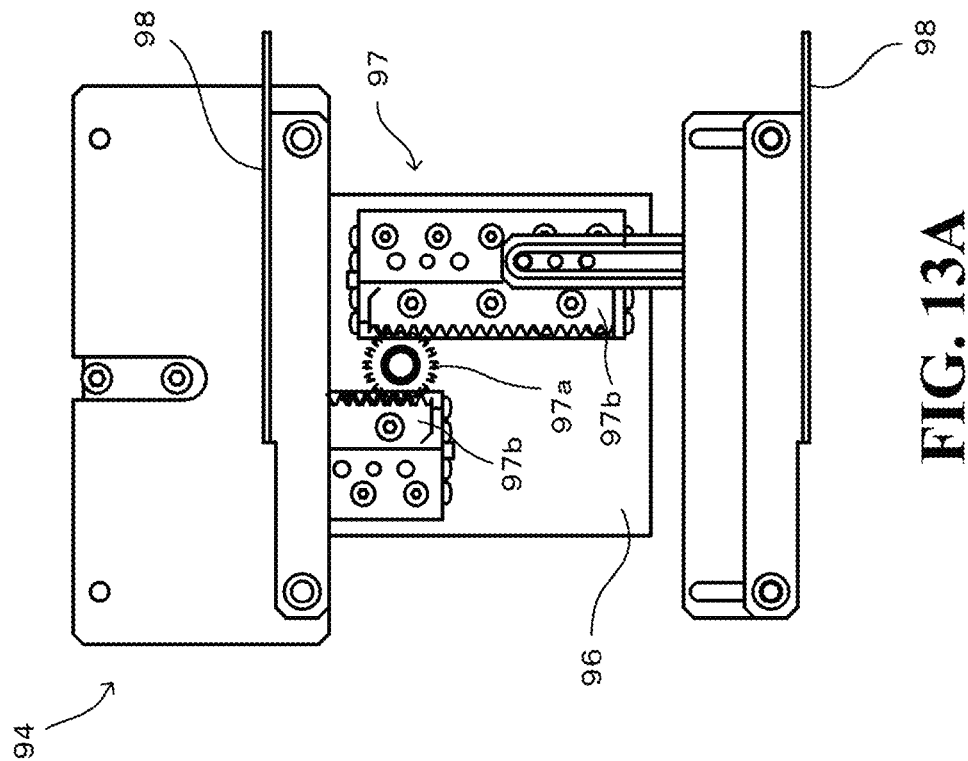
FIG. 13A is a front view of a two-side openable packaging hand in open state.
Figure 14B:
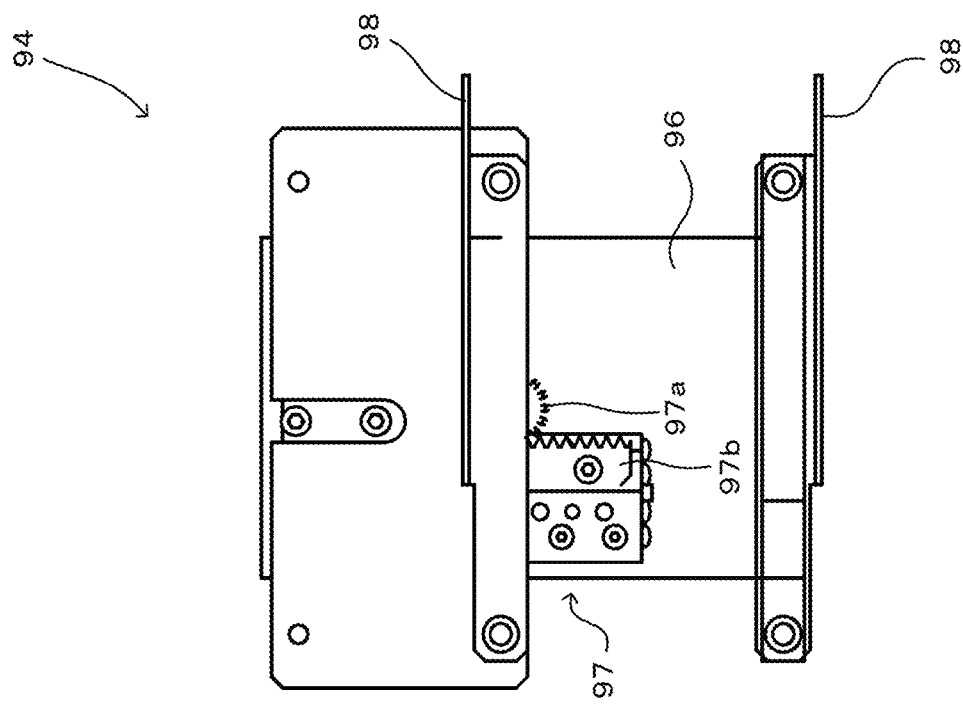
FIG. 14B is a front view of the one-side openable packaging hand in holding state.
Figure 14A:
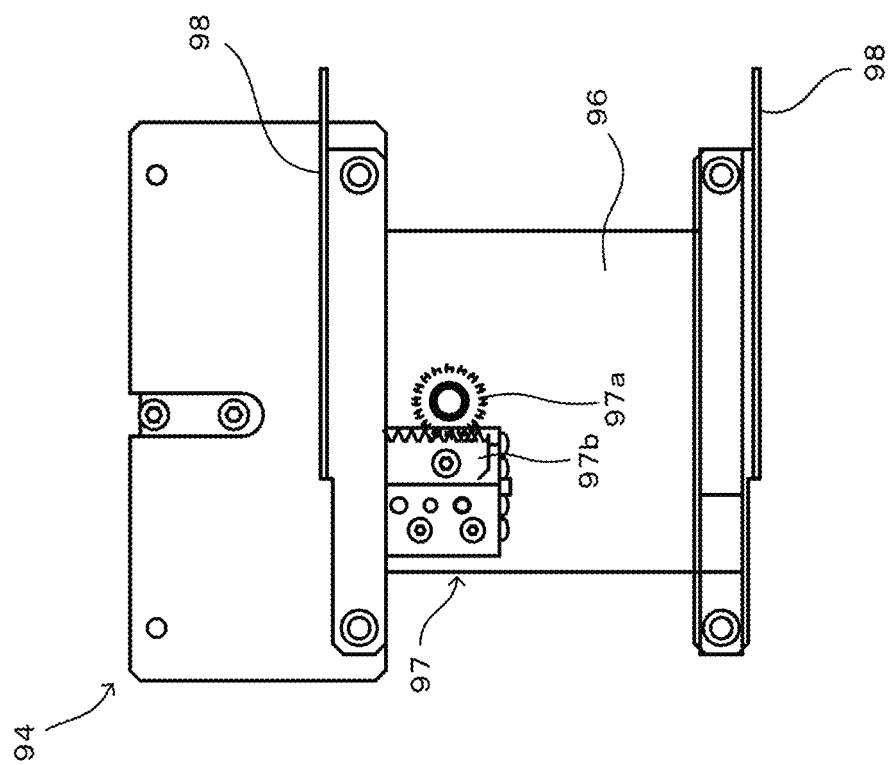
FIG. 14A is a front view of a one-side openable packaging hand in open state.
Figure 15:
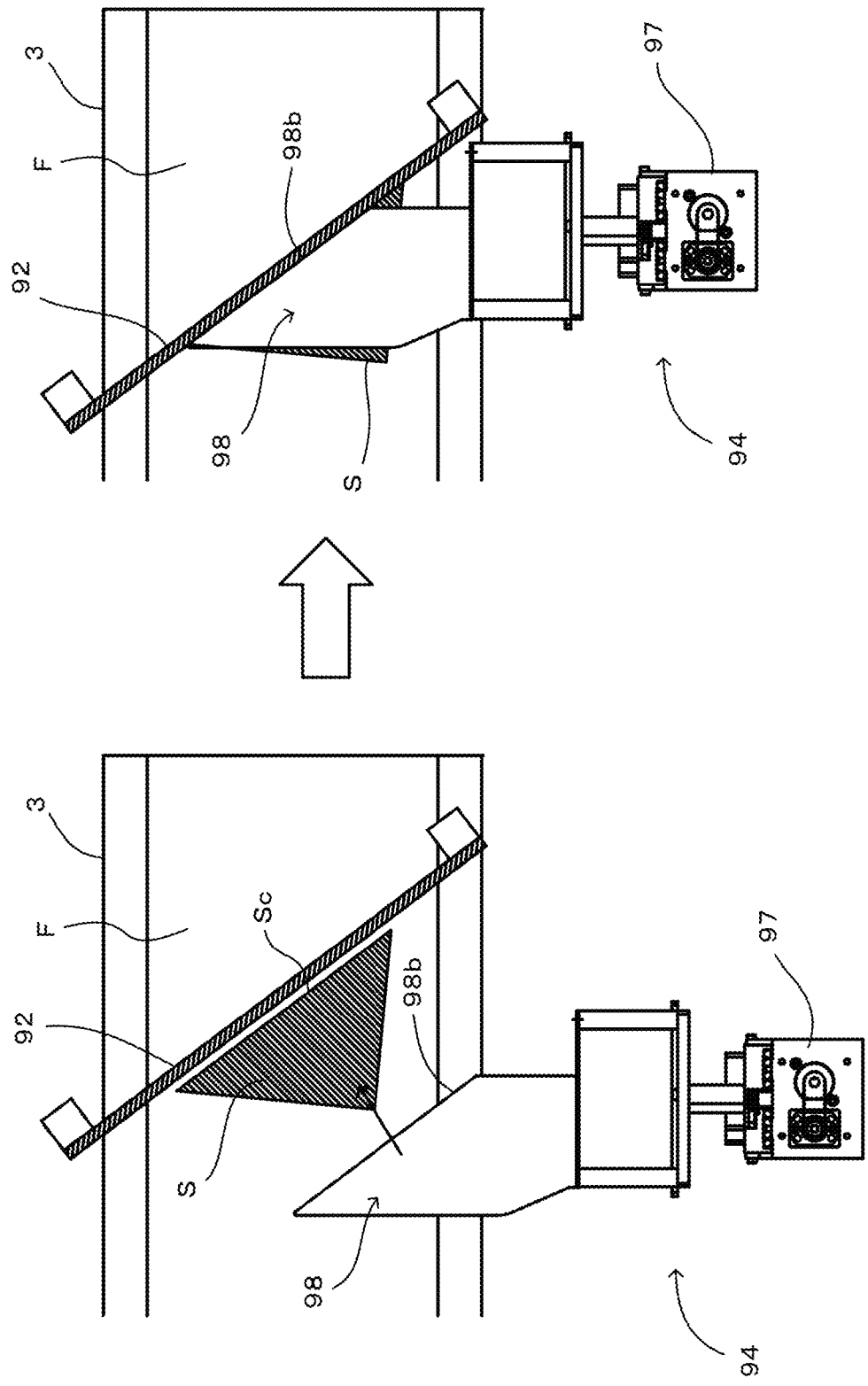
FIG. 15 illustrates how the packaging hand moves to hold sandwiches.
Figure 17B:
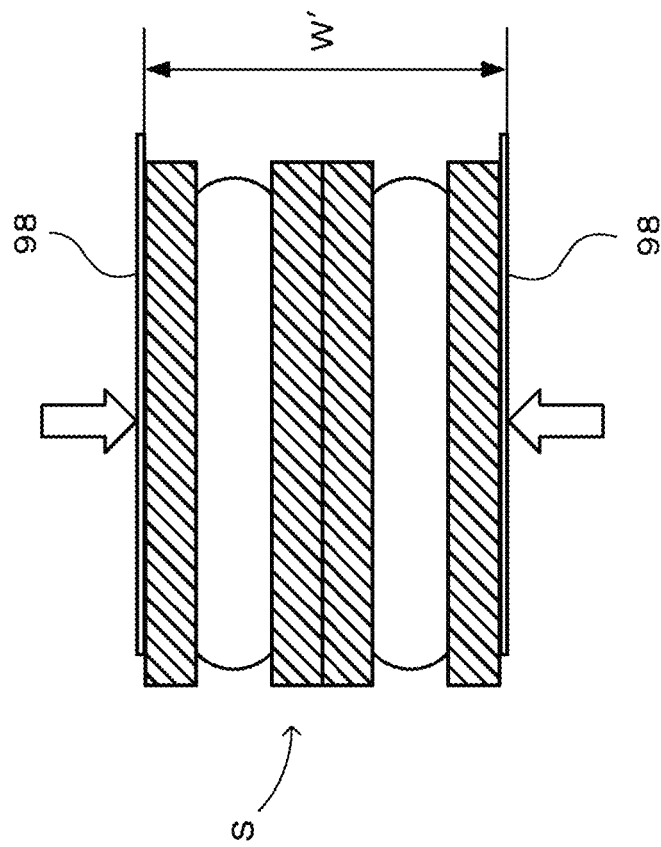
FIGS. 17A and 17B illustrate a change in the dimension of the sandwiches in their layered direction before and after the packaging hand holds the sandwiches.
Figure 17A:
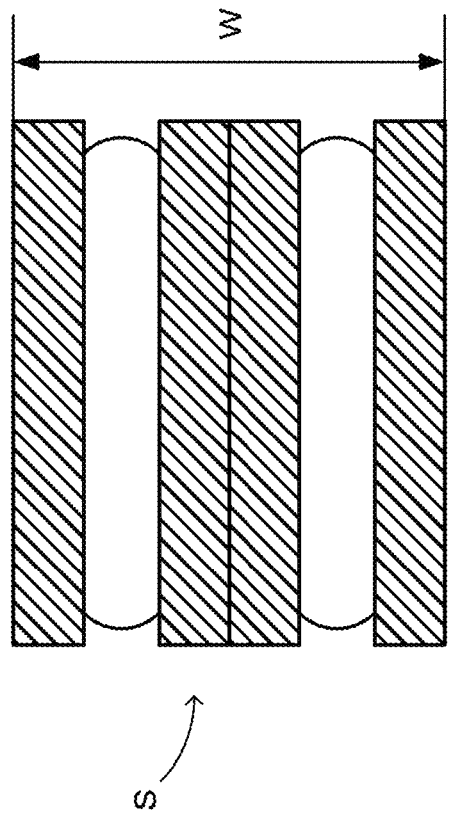
Figure 18:
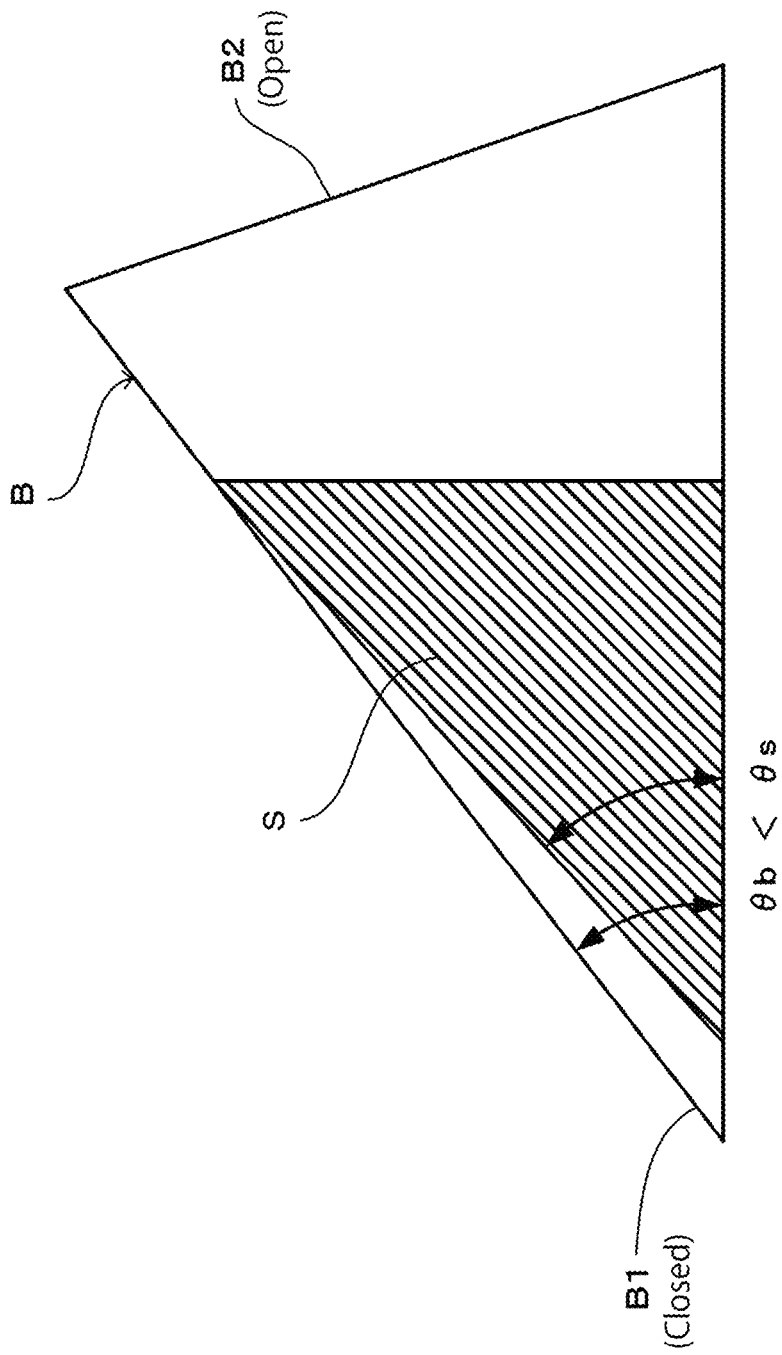
FIG. 18 illustrates a difference in leading end angle between a bag and a sandwich.

FIG. 12 is a top view of an example configuration of the bag filler 9. FIG. 13A is a front view of a two-side openable packaging hand 94 in open state. FIG. 13B is a front view of the two-side openable packaging hand 94 in holding state. FIG. 14A is a front view of a one-side openable packaging hand 94 in open state. FIG. 14B is a front view of the one-side openable packaging hand 94 in holding state. FIG. 15 illustrates how the packaging hand 94 moves to hold sandwiches S. FIG. 16A is a top view of the abutting unit 92 that is abutting the sandwiches S. FIG. 16B is a side view of the abutting unit 92 that is abutting the sandwiches S. FIGS. 17A and 17B illustrate a change in the dimension of the sandwiches S in their layered direction before and after the packaging hand 94 holds the sandwiches S.

As illustrated in FIG. 12, the bag filler 9 includes the carrying manipulator 91, the packaging hand 94, the abutting unit 92, and the second robot controller 93. The carrying manipulator 91 is located at one side of the conveyor 3. The packaging hand 94 is mounted on the leading arm end of the carrying manipulator 91. The abutting unit 92 is located near the carrying manipulator 91 on the conveyor 3. The second robot controller 93 is not illustrated in FIG. 12 (see FIG. 1).

A non-limiting example of the carrying manipulator 91 is a six-axis multi-articular arm robot. Within a region between the conveyor 3 and the packager 4, the carrying manipulator 9 makes horizontal movement, upward-downward movement, and rotation of the packaging hand 94. The packaging hand 94 and the carrying manipulator 91 are controlled by the second robot controller 93.

As illustrated in FIGS. 13A and 13B, the packaging hand 94 (which is a non-limiting example of the second hand recited in the appended claims) includes a hand base 96, an open-close drive mechanism 97, and a pair of tong members 98. The hand base 96 is mounted on the leading arm end of the carrying manipulator 91. The open-close drive mechanism 97 is located in the hand base 96. The pair of tong members 98 are fixed to movable portions of the open-close drive mechanism 97. The open-close drive mechanism 97 (which is a non-limiting example of the third drive mechanism recited in the appended claims) includes a motor, a pinion 97a, and racks 97b. With this configuration, the open-close drive mechanism 97 moves the pair of tong members 98 toward and away from each other. Each of the pair of tong members 98 is a planar metal having rigidity throughout the planar metal. The pair of tong members 98 face each other in the above-described open-close direction (the vertical direction in FIGS. 13A and 13B). Also, the pair of tong members 98 have approximately the same sizes and approximately the same shapes (see FIGS. 15, 19A, and 19B, described later). The shape of each tong member 98 will be detailed later. In the example illustrated in FIGS. 13A and 13B, the open-close drive mechanism 97 has a "two-side openable" configuration, in which the two tong members 98 are movable toward and away from each other through the two racks 97b. Another possible example is a "one-side openable" configuration, which is illustrated in FIGS. 14A and 14B, where one tong member 98 is fixed and the other tong member 98 is movable away from the one tong member 98.

As illustrated in FIG. 15, the packaging hand 94 makes sure that the direction (open-close direction) in which the pair of tong members 98 face each other is oriented in the vertical direction. With the pair of tong members 98 taking this posture, the packaging hand 94 inserts the lower tong member 98 into the space between the sandwich laminate S and the surface F (for example, the surface of the conveyor 3). Then, the packaging hand 94 moves the pair of tong members 98 toward each other, causing the pair of tong members 98 to hold the sandwich laminate S between the pair of tong members 98 in the layered direction. When the lower tong member 98 is inserted into the space between the sandwich laminate S and the surface F, the lower tong member 98 comes into contact with the abutting unit 92, which is located at the side of the sandwich laminate S opposite to the lower tong member 98 in the insertion direction. Thus, the abutting unit 92 prevents mal-positioning of the sandwich laminate S. In this embodiment, the cut surface Sc of the sandwich laminate S is pointed in an upper right direction in FIG. 15, and the right-angle portion of the sandwich laminate S is pointed in a lower left direction in FIG. 15. With the sandwich laminate S in this orientation, the lower tong member 98 is inserted into the space under the sandwich laminate S through the right-angle portion of the sandwich laminate S. The abutting unit 92 is placed on the conveyor 3 with an inclination angle (relative to the conveyance direction) adapted to the cut surface Sc of the sandwich laminate S. Referring to the left-side figure illustrated in FIG. 15, the conveyor 3 stops the movement of conveying the sandwich laminate S immediately before the sandwich laminate S comes into contact with the abutting unit 92. The packaging hand 94 holds the sandwich laminate S in stationary state.

As described above, the food substance S2 is exposed on the cut surface Sc of each sandwich S. This may cause seasoning and/or other substances of the food substance S2 to repeatedly attach to the surface of the abutting unit 92, which is a mechanical part. This is not preferable from a hygiene point of view. In light of the circumstances, the abutting unit 92 includes three contact portions 92a and two slits 92b, as illustrated in FIG. 16. The contact portions 92a and the slits 92b are alternately aligned in the vertical direction (in the layered direction of the sandwich laminate S). Specifically, the three contact portions 92a are bar-shaped members each horizontally arranged at a height corresponding to the height of one slice of bread S1 of the sandwich laminate S. The slits 92b are defined between the three contact portions 92a and correspond to the positions of the food substances S2 of the sandwich laminate S. This prevents the abutting unit 92 from contacting the cut surface Sc of the sandwich laminate S and, instead, makes the abutting unit 92 contact the slices of bread S1, which are harder portions. This eliminates or minimizes mal-positioning of the sandwich laminate S as a whole.

When the pair of tong members 98 hold the sandwich laminate S between the pair of tong members 98 in the layered direction, the open-close drive mechanism 97 applies a predetermined holding force between the pair of tong members 98. The control of applying the predetermined holding force is implemented by a second torque controller 93a of the second robot controller 93 (see FIG. 1) when the second torque controller 93a performs torque control of the motor of the open-close drive mechanism 97. With the predetermined holding force applied between the pair of tong members 98, the sandwich laminate S having a width dimension of W in the layered direction is compressed to a width dimension of W', as illustrated in FIGS. 17A and 17B. When the post-compression width dimension W' is a suitable dimension, the sandwich laminate S can be contained in the bag B.

It will be understood by those skilled in the art that the content of the food substance S2 and how the food substance S2 is arranged may vary from sandwich S to sandwich S, and that it is possible for the width dimension W' to be too large for the sandwich laminate S to be contained in the bag B, even though the sandwich laminate S is held with the predetermined holding force. In light of the circumstances, the open-close drive mechanism 97 may include an encoder or a similar device operable together with the motor of the open-close drive mechanism 97 to detect an angular position of the motor. Based on the detected angular position, a first determiner 93b (see FIG. 1) of the second robot controller 93 calculates the distance over which the pair of tong members 98 are away from each other, that is, calculates the width dimension W' of the sandwich laminate S. Based on the calculated width dimension W', the first determiner 93b determines whether the sandwich laminate S is containable in the bag B. When the determination made by the first determiner 93b is that the sandwich laminate S is containable in the bag B, the sandwich laminate S has a suitable width dimension W'. In this case, the second robot controller 93 controls the carrying manipulator 91 to transfer the sandwich laminate S to the packager 4. When the sandwich laminate S has an abnormal width dimension W', the second robot controller 93 controls the carrying manipulator 91 to transfer the sandwich laminate S to a disposal site, not illustrated.

The second torque controller 93a and the first determiner 93b are implemented in the form of software processed in the second robot controller 93, which is a computer including CPU, ROM, RAM, and other elements. In another possible embodiment, the second torque controller 93a and the first determiner 93b may be partially or entirely implemented by a tangible device or devices such as an application specific integrated circuit (ASIC), a field-programmable gate array (FPGA), and other electric circuits.

7. Details of Packaging Work

Details of the sandwich S packaging work using the packaging hand 94 will be described. As described above, sandwiches S are preferably contained in the bag B leaving as minimal empty space as possible in the bag B (in other words, sandwiches S preferably have a dominating volume ratio to the internal volume of the bag B). One purpose of securing minimal empty space is to make the food substance S2 more visually recognizable and more visually attractive when the packaged sandwiches S are put on store shelves. In light of the circumstances, this embodiment uses the bag B illustrated in FIG. 18. Specifically, the bag B has a closed side and an open side. The closed side has an acute angle and constitutes the bottom, B1, of the bag B. The open side has an opening B2. The sandwich laminate S has an approximately right-angled triangle shape. In order to package such sandwich laminate S in the bag B while leaving as minimal empty space as possible in the bag B, it is preferable to make the leading end angle, θb, of the apex of the bottom B1 equal to the leading end angle, θs, of the corresponding one apex of the sandwich laminate S, instead of making the internal shape of the bag B completely match the outer shape of the sandwich laminate S. It is more preferable to make the leading end angle θb smaller than the leading end angle θs. With the bag B having this internal shape, the packaging work of the flexible sandwich laminate S according to this embodiment is neater and performed in shorter takt time, which will be detailed below.

First, a comparative example in which packaging work is performed manually will be described by referring to FIGS. 19A, 19B, 20A, and 20B.

As illustrated in FIGS. 19A and 19B, a worker uses a tong 12 to hold a sandwich laminate S between the tong 12 in the layered direction. The tong 12, which is used in this manual work, is made up of two approximately right-angled triangle plates connected to each other through an elastic hinge. Each plate has an apex angle of θt1. The apex angle θt1 is slightly smaller than the angle, θb, of the apex of the bottom, B1, of the bag B (θt1<θb<θs). The worker handles the elastic hinge to open and close the tong 12. First, the worker holds the sandwich laminate S using the tong 12 while making sure that the apices of the plates of the tong 12 approximately match the corresponding one apex of the sandwich laminate S and that hypotenuses of the plates of the tong 12 approximately match the corresponding hypotenuse (cut surface Sc) of the sandwich laminate S. Holding the sandwich laminate S in this manner, the worker inserts the sandwich laminate S into the bag B. As described above, the leading end angle θb of the apex of the bottom B1 is equal to or smaller than the leading end angle θs of the corresponding one apex of the sandwich laminate S. This causes the upper apex of the sandwich laminate S to contact the inner surface of the bag B before the one apex of the sandwich laminate S reaches the apex of the bottom B1 of the bag B. The contact prevents the sandwich laminate S from proceeding further inward. If the sandwich laminate S is nonetheless forced further inward, the food substance S2 exposed on the cut surface Sc of the sandwich laminate S may attach to the inner surface of the bag B.

In light of the circumstances, as illustrated in FIGS. 20A and 20B, the worker opens the tong 12 to release the sandwich laminate S, and slightly pulls the tong 12 backward. Then, the worker re-holds the sandwich laminate S using the tong 12 in such a manner that the bottom sides of the plates of the tong 12 match the bottom side of the sandwich laminate S. Then, the worker holds an upper portion of the opening B2 of the bag B by a hand and slightly inclines the bag B. With the bag B in this inclined posture, the worker slides the tong 12 with the sandwich laminate S inward, thereby inserting the sandwich laminate S again into the bag B. By holding the upper portion of the opening B2 of the bag B and inclining the bag B, there occurs room between the hypotenuse of the bag B and the cut surface Sc of the sandwich laminate S, and the leading end angle θb of the apex of the bottom B1 of the bag B becomes equal to or larger than the leading end angle θs of the corresponding one apex of the sandwich laminate S. The room allows the one apex of the sandwich laminate S to reach the apex of the bottom B1 of the bag B without contacting the food substance S2.

Figure 22A:
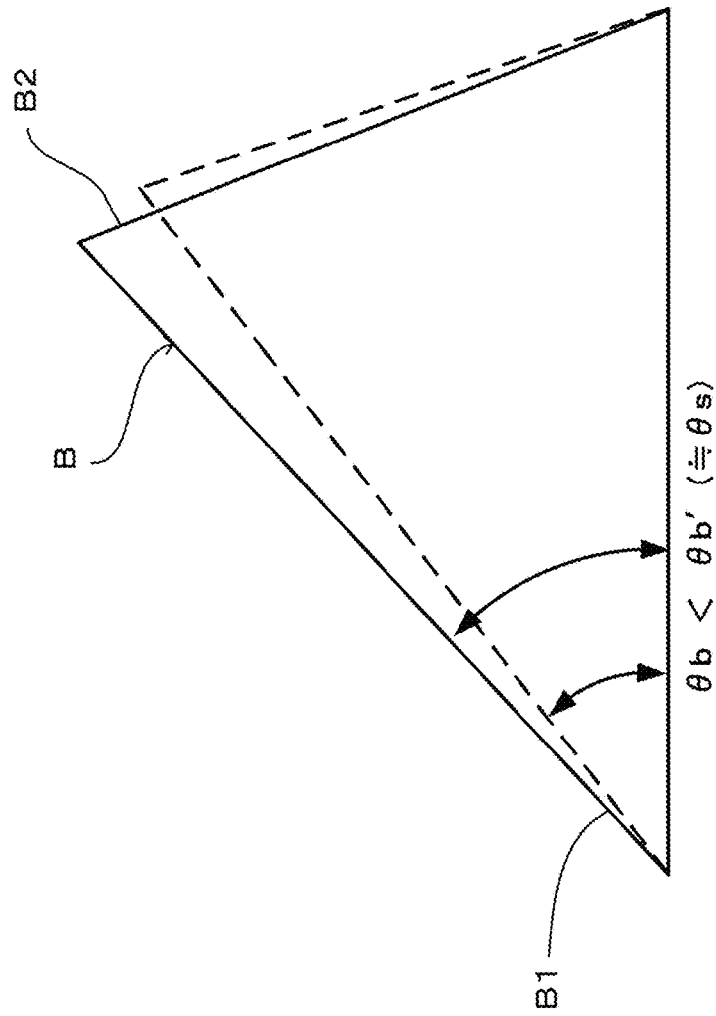
FIG. 22A is a side view of a bag before and after reshaping of the bag.
Figure 22B:
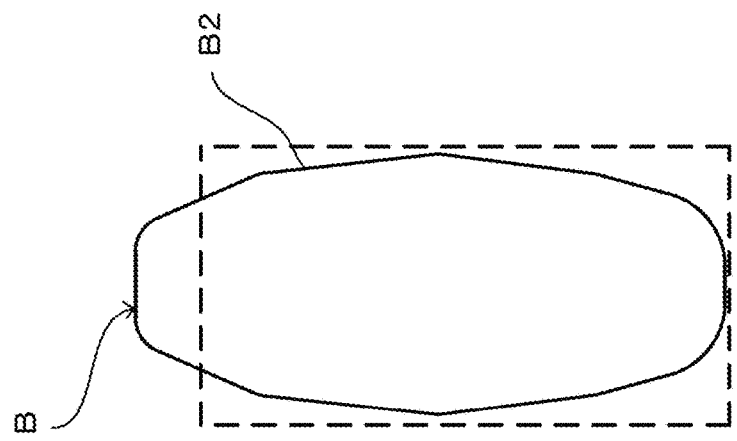
FIG. 22B is an opening-front view of the bag before and after reshaping of the bag.
Figure 23B:
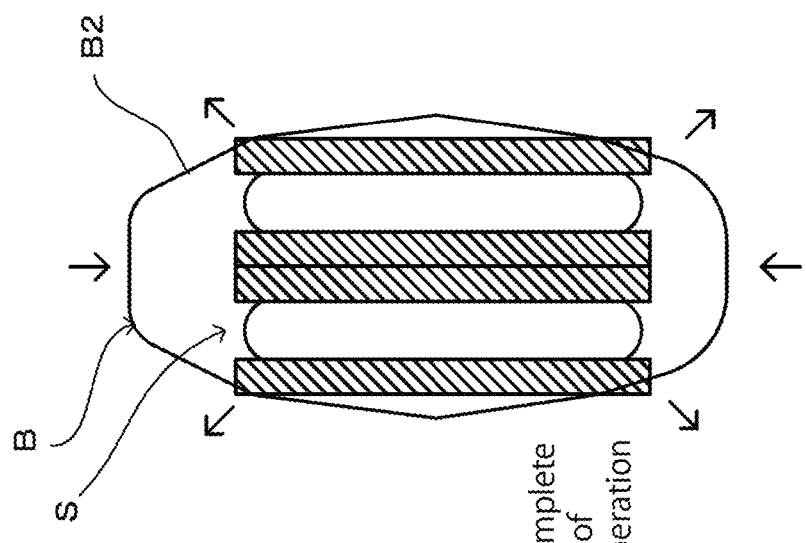
FIG. 23B is an opening-front view of the bag in the insertion operation.
Figure 23A:
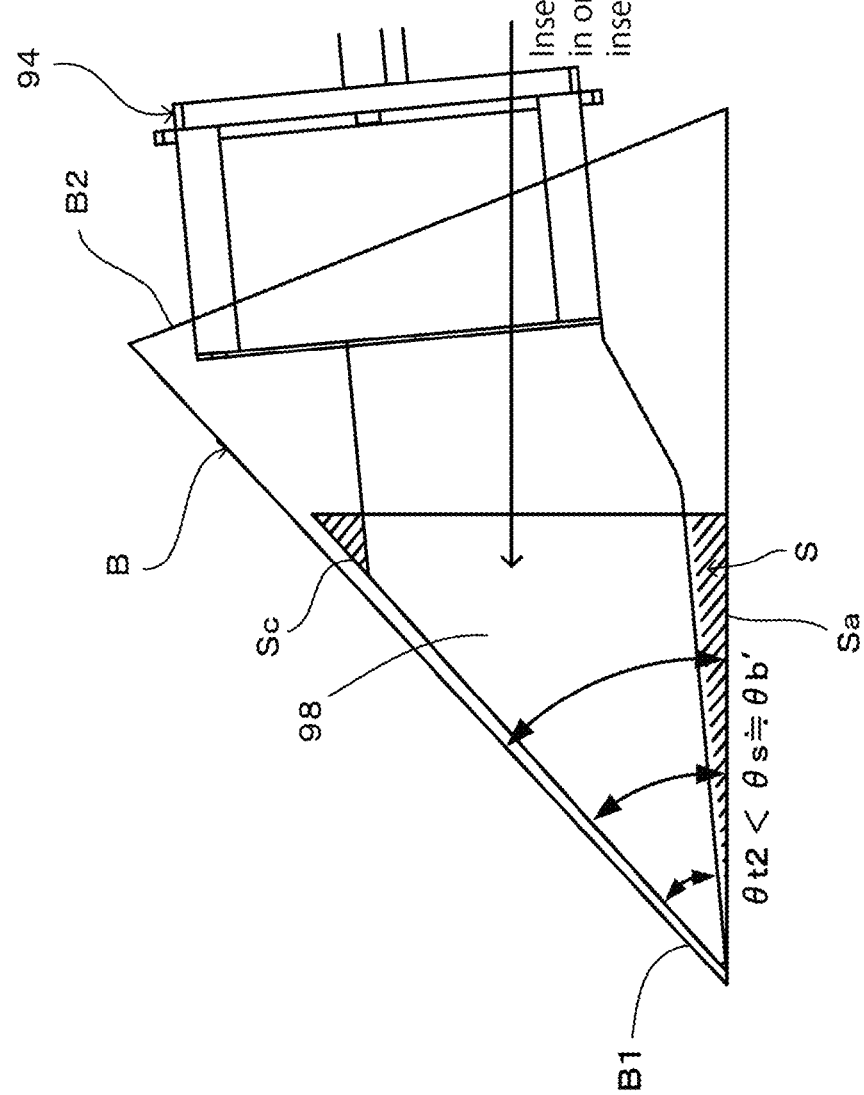
FIG. 23A is a side view of the bag in an insertion operation of the sandwich laminate into the bag.

While the comparative example involves two times of insertion operation, the embodiment involves one time of insertion operation using the packaging hand 94 and provides a packaging state equivalent to the packaging state provided in the comparative example. FIG. 21 illustrates the shape of each of the pair of tong members 98 of the packaging hand 94 and illustrates how the pair of tong members 98 hold the sandwich laminate S. FIGS. 22A and 22B illustrate an example opening state of the bag B. FIGS. 23A and 23B illustrate an example insertion operation of the sandwich laminate S.

As illustrated in FIG. 21, the pair of tong members 98 of the packaging hand 94 (the open-close drive mechanism 97 is not illustrated) are planar members each having an approximately pentagonal shape. The pair of tong members 98 face each other in the open-close direction in which the pair of tong members 98 open and close (the open-close direction corresponds to the direction perpendicular to the paper surface of FIG. 21 and corresponds to the layered direction of the sandwich laminate S illustrated in FIG. 21). The pair of tong members 98 secure a sufficiently wide gap between the pair of tong members 98, and then move to receive the sandwich laminate S between the pair of tong members 98 in the layered direction. Then, the pair of tong members 98 move toward each other to hold the sandwich laminate S between the pair of tong members 98. The sandwich laminate S has an apex Se at the leading end of the sandwich laminate S in its insertion direction. Each of the pair of tong members 98 has an apex 98a at the leading end of the tong member 98 and has an abutting surface 98b, which is the hypotenuse of the tong member 98. When the pair of tong members 98 hold the sandwich laminate S, the apex Se of the sandwich laminate S and the apex 98a of each tong member 98 match each other, as seen from the layered direction of the sandwich laminate S. Also when the pair of tong members 98 hold the sandwich laminate S, the cut surface Sc of the sandwich laminate S and the abutting surface 98b match each other, as seen from the layered direction of the sandwich laminate S. Each tong member 98 has such a shape that the leading end angle, θt2, of the tong member 98 is smaller than the corresponding leading end angle θs of the sandwich laminate S and that the right-angle portion of the sandwich laminate S protrudes beyond the tong member 98 when the pair of the tong members 98 are in the above-described holding state, as seen from the right-side figure illustrated in FIG. 21. As described above, the pair of tong members 98 hold the sandwich laminate S while ensuring that the abutting surfaces 98b of the pair of tong members 98 match the cut surface Sc of the sandwich laminate S. For this purpose, the abutting surfaces 98b of the pair of tong members 98 and the sandwich laminate S are brought into contact with the abutting unit 92, as illustrated in FIG. 15.

At the packager 4, the bag B is made to open as illustrated in FIGS. 22A and 22B, and is held by a holder, not illustrated, with the opening B2 directed upward in the vertical direction. In FIG. 22A, the bottom B1 is located on the left, as in other drawings, and the opening B2 is located on the right (or on the front side of the paper surface). The holder holds the bag B and reshapes the bag B. Specifically, the holder expands the bag B to increase the leading end angle θb of the apex of the bottom B1 to an angle of θb'. The angle θb' is approximately the same as the leading end angle θs of the corresponding one apex of the sandwich laminate S. As illustrated in FIG. 22B, the reshaped bag B is diminished in the width of the opening B2 because of the increase in the angle of the apex of the bottom B1. Still, the bread S1 of the sandwich laminate S is elastic enough to deform according to the shape of the bag B.

With the bag B held in the reshaped state and with the sandwich laminate S held in the manner illustrated in FIG. 21, the carrying manipulator 91 inserts the sandwich laminate S into the bag B through the opening B2 together with the pair of tong members 98. This insertion operation needs to be performed only once, and as illustrated in FIG. 23A, the leading end of the sandwich laminate S and the leading ends of the pair of tong members 98 are smoothly guided to the leading end of the bottom B1 of the bag B. Also, as a result of the reshaping of the bag B, the leading end angle θb' of the apex of the bottom B1 of the bag B is approximately equal to the leading end angle θs of the corresponding one apex of the sandwich laminate S. This prevents the food substance S2 exposed on the cut surface Sc of the sandwich laminate S from attaching to the inner surface of the bag B, insofar as one side Sa of the sandwich laminate S slides on the inner bottom surface of the bag B. Then, the pair of tong members 98 are removed from the bag B. After the pair of tong members 98 have been removed from the bag B, the elasticity of the bread S1 increases the width dimension of the sandwich laminate S. This makes the volume ratio of the sandwich laminate S to the internal volume of the bag B such a dominating volume ratio that the bag B is approximately full of the sandwich laminate S.

Thus, the leading end angle θb of the bag B is smaller than the leading end angle θs of the corresponding one apex of the sandwich laminate S. The packaging hand 94 inserts the sandwich laminate S into such bag B in one time of insertion operation. Additionally, the packaging hand 94 performs this insertion operation smoothly while preventing attachment of the food substance S2 to the bag B and leaving as minimal empty space as possible in the bag B.

8. Advantageous Effects of the Embodiment

As has been described hereinbefore, the sandwich packaging system 1 according to this embodiment includes a conveyor 3, a two-level laminate maker 8, a bag filler 9, and a packager 4. The conveyor 3 conveys a first sandwich S and a second sandwich S. The two-level laminate maker 8 laminates the first sandwich S onto the second sandwich S on the conveyor 3, thereby making a sandwich laminate S. The bag filler 9 holds the sandwich laminate S and carries the sandwich laminate S from the conveyor 3. The packager 4 holds a bag B for the sandwich laminate S carried by the bag filler 9 and receives the sandwich laminate into the bag B.

A sandwich S is a layered food made by placing a food substance S2 between two slices of bread S1. A plurality of such sandwiches S are arranged side by side and packaged in the sandwich packaging system 1. Specifically, the two-level laminate maker 8 laminates a plurality of sandwiches S to make a sandwich laminate S. The bag filler 9 holds and carries the sandwich laminate S from the conveyor 3. The packager 4 packages the sandwich laminate S in the bag B. Thus, the sandwich packaging system 1 packages sandwiches S automatically, instead of manually, promoting automation of sandwich production lines.

Also in this embodiment, the sandwich packaging system 1 further includes a first conveyance line L, a second conveyance line L, and a traverser 2. Each of the first conveyance line L and the second conveyance line L includes the conveyor 3, the two-level laminate maker 8, and the bag filler 9. The traverser 2 receives combinations of the first sandwich S and the second sandwich S from a cutting machine used in the previous process, and distributes the combinations of the first sandwich S and the second sandwich S at equal spatial intervals to the conveyor 3 of the first conveyance line L and the conveyor 3 of the second conveyance line L. The bag filler 9 of the first conveyance line L and the bag filler 9 of the second conveyance line L alternately carry the sandwich laminate S into the bag B held by the packager 4. Thus, sandwich laminate making work, in which takt time is generally difficult to reduce, is performed parallelly on a plurality of conveyance lines L. This ensures that the process capability of the sandwich packaging system 1 can be increased by increasing the number of conveyance lines L. Thus, the sandwich packaging system 1 promotes automation of sandwich production lines while ensuring a desired process capability.

Also in this embodiment, the sandwich packaging system 1 further includes a position detection camera 6 and a position corrector 7. The position detection camera 6 is located at the upstream side of the two-level laminate maker 8 in the conveyance direction of the conveyor 3, and detects the position of the first sandwich S and the second sandwich S. The position corrector 7 is located at the upstream side of the two-level laminate maker 8. Based on the position detected by the position detection camera 6, the position corrector 7 positions the first sandwich S and the second sandwich S at a predetermined position.

Sandwiches S are cut in the cutting machine in the previous process and conveyed on the conveyor 3 in the sandwich packaging system 1. Through the cutting and conveyance, sandwiches S may be displaced from a desired position (X axis direction and/or Y axis direction) and/or a desired orientation (angle of θ about the Z axis) on the conveyor 3. In light of the circumstances, in this embodiment, the position detection camera 6 detects the position of sandwiches S, and the position corrector 7 performs positioning of the sandwiches S based on the detected position. Thus, even if sandwiches S are displaced from a desired position and/or from a desired orientation on the conveyor 3, the sandwiches S are automatically corrected to the desired position and/or the desired orientation. Additionally, this positioning operation is performed at the upstream side of the two-level laminate maker 8, resulting in improved accuracy of the work performed at the downstream side (such as laminate making work performed by the two-level laminate maker 8 and holding work performed by the bag filler 9). Thus, the sandwich packaging system 1 provides sandwiches S that are more reliable in quality.

Also in this embodiment, the sandwich packaging system 1 further includes a sorter 5. The sorter 5 measures the weight of the sandwich laminate S contained in the bag B at the packager 4. Based on the measured weight of the sandwich laminate S, the sorter 5 sorts the sandwich laminate S discharged from the packager 4. Specifically, for example, when the amount of the food substance S2 is a proper amount, the sorter 5 transfers the sandwich laminate S to the bag enclosure used in the next process. When the amount of the food substance S2 is not a proper amount, the sorter 5 discharges the sandwich laminate S to a disposal site. Thus, the sandwich packaging system 1 provides sandwiches S that are more reliable in quality.

Also in this embodiment, the two-level laminate maker 8 includes a two-level laminate making hand 84. The two-level laminate making hand 84 raises the sandwich St and places the sandwich St onto the sandwich Sb. The two-level laminate making hand 84 includes a pressing member 88 and a pair of support members 89. The pressing member 88 is movable in the layered direction of the sandwiches St and Sb to press the upper surface of the sandwich St. The pair of support members 89 are movable toward and away from each other in directions perpendicular to the layered direction, and support the lower surface of the sandwich St.

If the sandwich St is laminated on the sandwich Sb inaccurately, a sandwich laminate S of inferior quality may result. For example, at the time of packaging of the sandwich laminate S, the leading end of the sandwich laminate S may stop short of reaching the leading end of the bag B. For further example, a step may occur between the sandwiches St and Sb of the packaged sandwich laminate S. In view of the circumstances, this embodiment ensures more accurate laminate making work. Specifically, in the sandwich laminate making work, the two-level laminate making hand 84 presses the upper surface of the sandwich St using the pressing member 88, in addition to supporting the lower surface of the sandwich St using the pair of support members 89. Thus, the two-level laminate making hand 84 holds the sandwich St from above and below the sandwich St. This enables the two-level laminate making hand 84 to stably hold the sandwich St even while making a movement and/or a rotation. This, in turn, eliminates or minimizes dropping and displacement of the sandwich St, resulting in improved accuracy of the sandwich laminate making work.

Also in this embodiment, each of the sandwiches St and Sb has an approximately right-angled triangle shape as seen from the layered direction, and the sandwiches St and Sb are arranged side by side on the conveyor 3 with the cut surfaces Sc of the sandwiches St and Sb facing each other. The two-level laminate making hand 84 raises the sandwich St, turns the sandwich St, and places the sandwich St onto the sandwich Sb. The pressing member 88 includes contact portions 88a. Each of the contact portions 88a comes into contact with one of three corner portions of the sandwich St.

Generally, a square sandwich S is made by placing a food substance S2 between two square slices of bread S1. Then, the square sandwich S is diagonally cut into a pair of right-angled triangle sandwiches S. In the square sandwich S, the food substance S2 exists over a central area between the two square slices of bread S1; that is, no or little food substance S2 exists in the vicinity of the edges of the four sides of the two square slices of bread S1. That is, in the vicinity of the edges of the four sides of the two square slices of bread S1, there is only a laminate of two slices of bread S1, with or little food substance S2 in between. Such sandwich S is diagonally cut into two right-angled triangle sandwiches S. In each right-angled triangle sandwich S, the food substance S2 is exposed on the cut surface Sc. In contrast, no or little food substance S2 exists at both ends of the sandwich S in its longitudinal direction of the sandwich S and in the vicinity of the edges of the other two side surfaces Sa of the sandwich S. As a result, no or little food substance S2 exists at three corner portions of the right-angled triangle sandwich S. That is, at the three corner portions of the right-angled triangle sandwich S, there is only a laminate of two slices of bread S1.

In this embodiment, the contact portions 88a of the pressing member 88 respectively correspond to (are configured to contact) the three corner portions of the sandwich S. This ensures that the sandwich S is pressed and the food substance S2 is prevented from bulging at the same time. Thus, the sandwich packaging system 1 provides sandwiches S that are more reliable in quality.

Also in this embodiment, the pair of support members 89 move toward each other to enter the spaces under the lower surface of the first sandwich S through center portions of the two side surfaces Sa of the first sandwich S, and slide under the lower surface of the first sandwich S while avoiding overlapping with the three corner portions of the first sandwich S that are in contact with the contact portions 88a of the pressing member 88.

In the right-angled triangle sandwich S, the bread S1 closely contacts the surface F of the conveyor 3 at the central portion of the bread S1 where the food substance S2 exists and at the three corner portions of the bread S1 that are in contact with the contact portions 88a. In contrast, there is a slight amount of space between the bread S1 and the surface F at the side surfaces Sa of the bread S1. If the pair of support members 89 (pair of second extending portions 89b) are forced to enter between the bread S1 and the surface F where the bread S1 and the surface F closely contact each other, there is a possibility of damage to the bread S1. In light of this, the pair of support members 89 preferably enter the spaces d between the bread S1 and the surface F.

Thus, the pair of support members 89 are inserted under the bread S1 through the center portions of the two side surfaces Sa of the sandwich S, with the spaces d utilized effectively. Also, the pair of support members 89 slide under the bread S1 while avoiding overlapping with the three corner portions of the sandwich S that are in contact with the contact portions 88a of the pressing member 88. This enables the pair of support members 89 to be inserted under the bread S1 while eliminating or minimizing damage to the bread S1. Thus, the sandwich packaging system 1 provides sandwiches S that are more reliable in quality.

Also in this embodiment, each of the pair of support members 89 includes a first extending portion 89a and a second extending portion 89b. The first extending portion 89a extends in the layered direction of the sandwich S. The second extending portion 89b is connected to the first extending portion 89a and extends in a direction in which the angle between the first extending portion 89a and the second extending portion 89b is an obtuse angle. The second extending portion 89b slides under the lower surface of the sandwich S. Forming an obtuse angle between the first extending portion 89a and the second extending portion 89b of each support member 98 makes the second extending portion 89b more easily enter the space under the sandwich S, as compared with the case of forming right angles between the first extending portion 89a and the second extending portion 89b.

Also in this embodiment, the two-level laminate maker 8 includes a lifting drive mechanism 86, an open-close drive mechanism 87, and a first robot controller 83. The lifting drive mechanism 86 drives the pressing member 88. The open-close drive mechanism 87 drives the pair of support members 89 to move toward and away from each other. The first robot controller 83 includes a first torque controller 83a and a position controller 83b. The first torque controller 83a performs torque control of the lifting drive mechanism 86 to make the pressing force of the pressing member 88 a predetermined pressing force. The position controller 83b performs position control of the open-close drive mechanism 87 to make the pair of support members 89 enter the spaces under the lower surface of the sandwich S by a predetermined distance.

By performing torque control of the lifting drive mechanism 86, which drives the pressing member 88, the first torque controller 83a enables the pressing member 88 to press the sandwich S at a uniform pressing force. Also by performing torque control of the lifting drive mechanism 86, the first torque controller 83a is able to make subtle changes in the pressing force. By performing position control of the open-close drive mechanism 87, which drives the pair of support members 89 to move toward and away from each other, the position controller 83b enables the pair of support members 89 to hold the sandwich S more stably. Also by performing position control of the open-close drive mechanism 87, the position controller 83b is able to control the distance by which the pair of support members 89 slide under the lower surface of the bread S1 so as to prevent the pair of support members 89 from damaging the bread S1. Specifically, the position controller 83b controls the pair of support members 89 to stop short of entering the area (food substance distributed area) defined by the three corner portions of the bread S1 that are in contact with the three contact portions 88a and on the central portion of the bread S1. A non-limiting example of each of the lifting drive mechanism 86 and the open-close drive mechanism 87 is a servo motor. Using a servo motor enables the lifting drive mechanism 86 and the open-close drive mechanism 87 to deal with the cases where there are a variety of sandwiches S. For example, sandwiches S may have different thicknesses because the amount and kind of the food substance S2 and the thickness of the bread S1 may vary from sandwich S to sandwich S. A servo motor deals with a variety of sandwiches S by changing parameters.

Also in this embodiment, the sandwich packaging system 1 further includes a pressing unit 82, which is located near the two-level laminate maker 8. The pressing unit 82 starts a pressing operation of pressing the sandwich Sb before the two-level laminate making hand 84 raises the sandwich St, and ends the pressing operation of pressing the sandwich Sb after the two-level laminate making hand 84 has placed the sandwich St onto the sandwich Sb. This eliminates or minimizes mal-positioning of the sandwich Sb when the two-level laminate making hand 84 raises the sandwich St and laminates the sandwich St onto the sandwich Sb. This further improves the accuracy of the sandwich laminate making work.

Also in this embodiment, the bag filler 9 includes a packaging hand 94, an open-close drive mechanism 97, and a second robot controller 93. The packaging hand 94 includes a pair of tong members 98, which holds the sandwich laminate S. The open-close drive mechanism 97 drives the pair of tong members 98 to move toward and away from each other in the layered direction. The second robot controller 93 includes a second torque controller 93a.

The second torque controller 93a performs torque control of the open-close drive mechanism 97 to make the holding force of the pair of tong members 98 a predetermined holding force.

In this embodiment, the second torque controller 93a performs torque control of the open-close drive mechanism 97 to make the holding force of the pair of tong members 98 a predetermined holding force. This enables the pair of tong members 98 to hold the flexible sandwich laminate S while pressing the sandwich laminate S at a uniform pressing force. This, in turn, eliminates or minimizes dropping and displacement of the sandwich laminate S. As a result, the accuracy of the packaging work improves. A non-limiting example of the open-close drive mechanism 97 is a servo motor. Using a servo motor enables the open-close drive mechanism 97 to deal with the cases where there are a variety of sandwiches S. For example, sandwiches S may have different thicknesses because the amount and kind of the food substance S2 and the thickness of the bread S1 may vary from sandwich S to sandwich S. A servo motor deals with a variety of sandwiches S by changing parameters.

Also in this embodiment, as seen from the layered direction, the sandwich laminate S has an approximately right-angled triangle shape having a right-angle portion and two acute-angle portions. As seen from the layered direction, the leading ends of the pair of tong members 98 each have an angle (leading end angle θt2) smaller than the angle (leading end angle θs) of each of the two acute-angle portions of the sandwich laminate S. This enables the leading end (acute-angle portion) of the sandwich laminate S to reach the leading end (bottom B1) of the bag B even when the leading end angle θb of the apex of the bottom B1 of the bag B is equal to or smaller than the leading end angle θs of the acute-angle portion of the sandwich laminate S. This makes the bag B approximately full of the sandwich laminate S (with a highest possible occupation ratio), that is, as minimal empty space as possible is left in the bag B, making the packaged sandwich laminate S visually and gastronomically appealing.

Also in this embodiment, the pair of tong members 98 hold the sandwich laminate S such that: as seen from the layered direction, the apex Se of one acute-angle portion (leading end) of the sandwich laminate S matches the apexes 98a of the leading ends of the pair of tong members 98; as seen from the layered direction, the cut surface Sc of the sandwich laminate S is flush with the abutting surfaces 98b (hypotenuses) of the pair of tong members 98; and as seen from the layered direction, the right-angle portion of the sandwich laminate S protrudes beyond the pair of tong members 98.

Assume that the food substance S2 exposed on the cut surface Sc of the sandwich laminate S contacts the bag B when the sandwich laminate S is inserted into the bag B. This makes the sandwich laminate S adhered to the bag B, preventing the leading end of the sandwich laminate S from reaching the apex of the bottom B1 of the bag B. Also, if the food substance S2 is attached to the bag B, the packaged sandwich laminate S may become less visually and gastronomically appealing.

In this embodiment, the pair of tong members 98 hold the sandwich laminate S such that the apex Se of one acute-angle portion of the sandwich laminate S matches the apexes 98a of the leading ends of the pair of tong members 98, and that the cut surface Sc of the sandwich laminate S is flush with the abutting surfaces 98b of the pair of tong members 98. This ensures that the sandwich laminate S is inserted into the bag B with the leading end of the sandwich laminate S reaching the apex of the bottom B1 of the bag B without the food substance S2 contacting the bag B. Thus, the sandwich packaging system 1 provides sandwiches S that are more reliable in quality.

Also, the pair of tong members 98 each have such a shape that while the pair of tong members 98 are holding the sandwich laminate S, the right-angle portion of the sandwich laminate S protrudes beyond the pair of tong members 98, as described above. This ensures that if the leading end angle θb of the apex of the bottom B1 of the bag B is equal to or smaller than the leading end angle θs of the corresponding one apex of the sandwich laminate S, the protruding portion of the sandwich laminate S (which is a portion where no food substance S2 exists) is deformed to make the shape of the sandwich laminate S match the shape of the bag B. As a result, the leading end of the sandwich laminate S reaches the apex of the bottom B1 of the bag B without damage to the sandwich laminate S.

Also in this embodiment, the sandwich packaging system 1 further includes an abutting unit 92. The abutting unit 92 is located near the bag filler 9. When one of the pair of tong members 98 slides under the lower surface of the sandwich laminate S, the cut surface Sc of the sandwich laminate S comes into contact the abutting unit 92. The abutting unit 92 includes a plurality of contact portions 92a and slits 92b. The plurality of contact portions 92a respectively contact the slices of bread S1 of the sandwich laminate S. The slits 92b are located between the plurality of contact portions 92a.

In this embodiment, when the pair of tong members 98 hold the sandwich laminate S, the cut surface Sc of the sandwich laminate S and the abutting surfaces 98b of the pair of tong members 98 come into contact with the abutting unit 92. This more easily makes the cut surface Sc of the sandwich laminate S flush with the abutting surfaces 98b of the pair of tong members 98, facilitating the positioning of the pair of tong members 98 and the sandwich laminate S. Also, the abutting unit 92 has slits to meet the food substances S2 of the sandwich laminate S. This prevents the food substances S2 from contacting the contact portions 92a, which instead contact the slices of the bread S1. Thus, the sandwich packaging system 1 provides sandwiches S that are more reliable in quality from a hygiene point of view as well.

Also in this embodiment, the pair of tong members 98 enter the bag B while preventing the food substances S2 exposed on the cut surface Sc of the sandwich laminate S from contacting the bag B before the leading ends of the pair of tong members 98 reach the leading end (bottom B1) of the bag B. This prevents the sandwich laminate S from attaching to the bag B, enabling the sandwich laminate S to reach the leading end of the bag B. Thus, the sandwich packaging system 1 provides sandwiches S that are more reliable in quality.

Also in this embodiment, the second robot controller 93 includes a first determiner 93b. The first determiner 93b detects the width dimension W' of the sandwich laminate S in the layered direction while the pair of tong members 98 are holding the sandwich laminate S with a predetermined holding force specified by the second torque controller 93a. Then, based on the detected dimension, the first determiner 93b determines whether the sandwich laminate S is containable in the bag B. This ensures that only a containable sandwich laminate S is contained in the bag B, resulting in improved reliability.

Also in this embodiment, the packager 4 includes a holder that holds the bag B with the opening B2 of the bag B directed upward. In this embodiment, the holder holds the bag B with the opening B2 directed upward. This makes the bag B more easily approchable from above the bag B, resulting in improved packaging workability. Also, after the sandwich laminate S is packaged, the weight of the sandwich laminate S acts on the leading end (bottom B1) of the bag B. This prevents the sandwich laminate S from being pulled out of the bag B or mal-positioned in the bag when the pair of tong members 98 of the packaging hand 94 are pull out of the bag B. Thus, the sandwich packaging system 1 provides sandwiches S that are more reliable in quality.

Also in this embodiment, as seen from the layered direction, the sandwich laminate S has an approximately right-angled triangle shape having a right-angle portion and two acute-angle portions. The bag B is for containing the approximately right-angled triangle shape of the sandwich laminate S. The packager 4 reshapes the bag B held by the holder to make the leading end angle θb of the bottom B1 of the bag B approximately match the leading end angle θs of the corresponding one apex of the sandwich laminate S. This enables the sandwich laminate S to reach the leading end of the bag B even when the leading end angle θb of the apex of the bottom B1 of the bag B is smaller than the leading end angle θs of the corresponding one apex of the sandwich laminate S.

Also in this embodiment, the sandwich packaging system 1 further includes a state detection camera 52 and a third robot controller 53. The state detection camera 52 picks up an image of the leading end of the bag B containing the sandwich laminate S. The third robot controller 53 includes a second determiner 54. Based on the image picked up by the state detection camera 52, the second determiner 54 determines whether the sandwich laminate S is suitably packaged. This enables the worker to check whether the sandwich laminate S is contained in the bag B with the leading end of the sandwich laminate S reaching the leading end of the bag B. When the sandwich laminate S is contained in the bag B with the leading end of the sandwich laminate S at the leading end of the bag B, the sorter 5, which is located next to the state detection camera 52, discharges the sandwich laminate S to the next process (bag enclosure). When the leading end of the sandwich laminate S is behind the leading end of the bag B, the sorter 5 discharges the sandwich laminate S to the disposal site. Thus, the sandwich packaging system 1 provides sandwiches S that are more reliable in quality.

9. Modifications

Modifications of the above-described embodiment will be described below.

In the above-described embodiment, the food to be packaged is a combination of sandwiches S. This configuration, however, is not intended in a limiting sense. Other possible examples include: hamburgers, rice-burgers, and other layered foods similar to sandwiches S; triangular foods similar to sandwiches S; and flexible foods similar to sandwiches S. Any of the elements and/or units of the sandwich packaging system 1 can be used for packaging work of these examples to promote automation of production lines.

In the above-described embodiment, a sandwich S has a three-layer structure in which a food substance S2 is held between two slices of bread S1; that is, a sandwich S used in the above-described embodiment has one layer of food substance S2. Another possible example is a five-layer structure in which two layers of food substance S2 are held between three slices of bread S1. Also, the sandwich packaging system 1 is capable of handling sandwiches S of any other multi-layer structures, and provides advantageous effects similar to the above-described advantageous effects.

Also in the above-described embodiment, the number of sandwiches S to be packaged in a single bag B is two. In another possible example, three or more sandwiches S may be packaged in a single bag B. Also in the above-described embodiment, the number of production lines in the sandwich packaging system 1 is two. In another possible example, the sandwich packaging system 1 may have three or more production lines insofar as the traverser 2 is capable of dealing with them. In still another possible example, the sandwich packaging system 1 may have a more complex production line(s) such that sandwiches S different from each other in the kind of bread S1 and/or the kind of food substance S2 are combined and packaged into a single bag B. Specifically, different kinds of sandwiches S may be alternately aligned in the conveyance direction on a single conveyance line L, and the two-level laminate maker 8 may laminate a sandwich S of one kind onto another sandwich S of a different kind. Alternatively, different kinds of sandwiches S may be respectively aligned on different conveyance lines L parallel to each other, and the two-level laminate maker 8 may be operable across the parallel conveyance lines L to make a sandwich laminate S by laminating different kinds of sandwiches S on top of one another.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", "match", and "different" are used in the context of dimensions, magnitudes, sizes, or positions, these terms may not necessarily mean "identical", "same", "equivalent", "match", and "different", respectively, in a strict sense. Specifically, the terms "identical", "same", "equivalent", and "different" mean "approximately identical", "approximately same", "approximately equivalent", "approximately match", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A layered food packaging system, comprising:
   a conveyor configured to convey a first layered food and a second layered food;
   a position correction device configured to adjust a position of the first layered food and the second layered food on the conveyor to a predetermined position by making adjustments on multiple axes;
   a lamination device configured to laminate the first layered food onto the second layered food on the conveyor such that a layered food laminate is made;
   a carrier device configured to hold the layered food laminate and carry the layered food laminate from the conveyor; and
   a package device configured to prepare a bag for the layered food laminate carried by the carrier device and place the layered food laminate into the bag.

2. The layered food packaging system according to claim 1, further comprising:
   a second conveyor configured to convey an additional first layered food and an additional second layered food;
   a second lamination device configured to laminate the additional first layered food onto the additional second layered food on the second conveyor such that a second layered food laminate is made;
   a second carrier device configured to hold the second layered food laminate and carry the second layered food laminate from the second conveyor; and
   a distribution device configured to receive combinations of a previously processed first layered food and a previously processed second layered food from a previous process and distribute the combinations of the previously processed first layered food and the previously processed second layered food at equal spatial intervals to the conveyor and the second conveyor, wherein
   the conveyor, the lamination device, and the carrier device form a first conveyance line,
   the second conveyor, the second lamination device, and the second carrier device form a second conveyance line, and
   the carrier device of the first conveyance line and the second carrier device of the second conveyance line are configured to alternately carry layered food laminates to the package device such that the carrier device of the first conveyance line carries the layered food laminate into the bag prepared by the package device and the second carrier device of the second conveyance line carries the second layered food laminate into a second bag prepared by the package device.

3. The layered food packaging system according to claim 1, further comprising:
   a position sensor positioned at an upstream side of the lamination device in a conveyance direction of the conveyor and configured to detect the position of the first layered food and the second layered food; wherein
   the position correction device is positioned at the upstream side of the lamination device in the conveyance direction of the conveyor and configured to, based on the position of the first layered food and the second layered food detected by the position sensor, adjust the first layered food and the second layered food to the predetermined position.

4. The layered food packaging system according to claim 1, further comprising:
   a sorting device configured to measure a weight of the layered food laminate in the bag at the package device and configured to, based on the weight of the layered food laminate measured by the sorting device, sort the layered food laminate discharged from the package device.

5. The layered food packaging system according to claim 1, wherein
   the lamination device comprises a first hand configured to raise the first layered food and place the first layered food onto the second layered food, and
   the first hand includes a pressing member configured to move in a layered direction of the first layered food to press an upper surface of the first layered food, and a pair of support members configured to move toward and away from each other in directions perpendicular to the layered direction and support a lower surface of the first layered food.

6. The layered food packaging system according to claim 5, wherein
the first layered food has a right-angled triangle shape as seen from the layered direction and has a first cut surface,
the second layered food has a right-angled triangle shape as seen from the layered direction and has a second cut surface,
the first layered food and the second layered food are arranged side by side on the conveyor with the first cut surface and the second cut surface facing each other,
the first hand is configured to raise the first layered food, turn the first layered food, and place the first layered food onto the second layered food, and
the pressing member comprises contact portions each configured to contact one of three corner portions of the first layered food.

7. The layered food packaging system according to claim 6, wherein
the first layered food has two side surfaces different from the first cut surface of the first layered food, and
the pair of support members is configured to move toward each other to enter a space under the lower surface of the first layered food through center portions of the two side surfaces of the first layered food, and slide under the lower surface of the first layered food while avoiding overlapping with the three corner portions of the first layered food that are in contact with the contact portions of the pressing member.

8. The layered food packaging system according to claim 5, wherein
each of the support members comprises a first extending portion extending in the layered direction, and a second extending portion connected to the first extending portion and extending in a direction in which an angle between the first extending portion and the second extending portion is an obtuse angle, and
the second extending portion is configured to slide under the lower surface of the first layered food.

9. The layered food packaging system according to claim 5, wherein
the lamination device comprises:
a first drive mechanism configured to drive the pressing member,
a second drive mechanism configured to drive the pair of support members to move toward and away from each other,
first robot control circuitry including first torque control circuitry configured to perform torque control of the first drive mechanism to cause a pressing force of the pressing member to be at a predetermined pressing force, and
position control circuitry configured to perform position control of the second drive mechanism to cause the pair of support members to slide under the lower surface of the first layered food by a predetermined distance.

10. The layered food packaging system according to claim 5, further comprising:
a pressing device positioned adjacent to the lamination device and configured to start a pressing operation of pressing the second layered food before the first hand raises the first layered food, and end the pressing operation after the first hand has placed the first layered food onto the second layered food.

11. The layered food packaging system according to claim 1, wherein
the carrier device comprises:
a hand including a pair of tong members configured to hold the layered food laminate,
a drive mechanism configured to drive the pair of tong members to move toward and away from each other in a layered direction of the first layered food, and
robot control circuitry including torque control circuitry configured to perform torque control of the drive mechanism to cause a holding force of the pair of tong members to be at a predetermined holding force.

12. The layered food packaging system according to claim 11, wherein
as seen from the layered direction, the layered food laminate has a right-angled triangle shape having a right-angle portion and two acute-angle portions, and
as seen from the layered direction, leading ends of the pair of tong members each have an angle smaller than an angle of each of the two acute-angle portions of the layered food laminate.

13. The layered food packaging system according to claim 12, wherein
the pair of tong members are configured to hold the layered food laminate such that as seen from the layered direction, an apex of one of the two acute-angle portions of the layered food laminate matches apexes of the leading ends of the pair of tong members, as seen from the layered direction, a cut surface of the layered food laminate is flush with abutting surfaces of the pair of tong members, and as seen from the layered direction, the right-angle portion of the layered food laminate protrudes beyond the pair of tong members.

14. The layered food packaging system according to claim 13, further comprising:
an abutting device positioned adjacent to the carrier device such that the abutting device comes into contact with the cut surface of the layered food laminate when a tong member among the pair of tong members slides under a lower surface of the layered food laminate, and
the abutting device includes a plurality of contact portions respectively configured to contact portions of the layered food laminate, and
slits formed between the plurality of contact portions.

15. The layered food packaging system according to claim 13, wherein
the pair of tong members are configured to enter the bag while preventing a food substance in the layered food laminate, and exposed on the cut surface of the layered food laminate, from contacting the bag before leading ends of the pair of tong members reach a leading end of the bag.

16. The layered food packaging system according to claim 11, wherein
the robot control circuitry is further configured to detect a dimension of the layered food laminate in the layered direction while the pair of tong members are holding the layered food laminate with the predetermined holding force specified by the torque control circuitry, and based on the detected dimension, determine whether the layered food laminate is containable in the bag.

17. The layered food packaging system according to claim 1, wherein
the package device comprises a preparation device configured to prepare the bag with an opening of the bag directed upward.

18. The layered food packaging system according to claim 17, wherein as seen from a layered direction of the first layered food, the layered food laminate has a right-angled triangle shape having a right-angle portion and two acute-angle portions, the bag is configured to contain the right-angled triangle shape of the layered food laminate, and the package device is configured to reshape the bag held by the preparation device to make a leading end opening angle of the bag match an angle of one of the two acute-angle portions of the layered food laminate.

19. The layered food packaging system according to claim 1, further comprising:

a camera configured to pick up an image of a leading end of the bag containing the layered food laminate; and robot control circuitry configured to determine, based on the image picked up by the camera, whether the layered food laminate is packaged without error.

20. The layered food packaging system according to claim 1, wherein the position correction device comprises:

a pair of angle members configured to adjust the position of the first layered food and the second layered food, and a pair of spatula members being inserted into respective spaces between a surface and the first layered food and the second layered food when the pair of angle members adjust the position.

* * * * *